(12) United States Patent
Takakusu et al.

(10) Patent No.: US 8,306,230 B2
(45) Date of Patent: Nov. 6, 2012

(54) INFORMATION PROCESSING APPARATUS PLAYING ENCRYPTED CONTENT DISTRIBUTED THROUGH NETWORK

(75) Inventors: Masakazu Takakusu, Kawasaki (JP);
Kiyoshi Kohiyama, Kawasaki (JP);
Tetsuya Sasao, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1269 days.

(21) Appl. No.: 11/976,764

(22) Filed: Oct. 26, 2007

(65) Prior Publication Data
US 2009/0129588 A1 May 21, 2009

(30) Foreign Application Priority Data

Nov. 1, 2006 (JP) ................................ 2006-297666

(51) Int. Cl.
*H04L 9/08* (2006.01)
*H04L 9/20* (2006.01)
(52) U.S. Cl. ............................ 380/286; 380/278; 380/45
(58) Field of Classification Search ........................ None
See application file for complete search history.

(56) References Cited

U.S. PATENT DOCUMENTS

| | | | | |
|---|---|---|---|---|
| 6,332,192 | B1 * | 12/2001 | Boroditsky et al. ............ | 713/168 |
| 7,116,785 | B2 * | 10/2006 | Okaue ........................... | 380/278 |
| 7,194,625 | B2 * | 3/2007 | Cormack et al. .............. | 713/168 |
| 2003/0007640 | A1 | 1/2003 | Harada et al. | |
| 2003/0084284 | A1 * | 5/2003 | Ando et al. .................... | 713/163 |
| 2003/0126457 | A1 | 7/2003 | Kohiyama et al. | |
| 2005/0010791 | A1 * | 1/2005 | Lang et al. .................... | 713/193 |
| 2006/0050931 | A1 | 3/2006 | Oka | |
| 2006/0053472 | A1 | 3/2006 | Goto et al. | |
| 2006/0168451 | A1 * | 7/2006 | Ishibashi et al. .............. | 713/176 |
| 2006/0233363 | A1 * | 10/2006 | Graunke ......................... | 380/42 |
| 2006/0291650 | A1 * | 12/2006 | Ananth .......................... | 380/46 |

FOREIGN PATENT DOCUMENTS

| | | |
|---|---|---|
| JP | 61-141231 | 6/1986 |
| JP | 10-065662 | 3/1998 |
| JP | 2003-131950 | 5/2003 |
| JP | 2003-198527 | 7/2003 |
| JP | 2005-033572 | 2/2005 |
| JP | 2005-085188 | 3/2005 |

(Continued)

OTHER PUBLICATIONS

Patent Abstract of Japan, Japanese Publication No. 2004-054913, Published Feb. 19, 2004.

(Continued)

*Primary Examiner* — Venkat Perungavoor
(74) *Attorney, Agent, or Firm* — Staas & Halsey LLP

(57) ABSTRACT

An information processing apparatus capable of effectively preventing unauthorized use of content distributed through a network when playing the content. The information processing apparatus includes a tamper-resistant secure module, a receiving block, and a playback block. The secure module includes a key storage block for storing a decryption key, a decryption block, and an encryption block. The receiving block receives distribution data distributed through the network and transfers the data to the decryption block. The decryption block decrypts the distribution data to obtain content by using the decryption key. The encryption block divides the content to a plurality of split pieces of content and encrypts them by using a temporary encryption key. Information on a temporary decryption key is output each time the temporary encryption key is changed. The playback block decrypts the encrypted pieces of content by using the temporary decryption key and combines and plays them.

2 Claims, 17 Drawing Sheets

FOREIGN PATENT DOCUMENTS

| | | |
|---|---|---|
| JP | 2006-039722 | 2/2006 |
| JP | 2006-067575 | 3/2006 |
| JP | 2006-079181 | 3/2006 |
| JP | 2006-201903 | 8/2006 |
| JP | 2006-244339 | 9/2006 |

OTHER PUBLICATIONS

Patent Abstract of Japan, Japanese Publication No. 2003-158514, Published May 30, 2003.
Patent Abstract of Japan, Japanese Publication No. 2004-129227, Published Apr. 22, 2004.
K. Kohiyama, et al. "Digital Content Rights Protection LSI for PC-Based Digital TV Receivers", Fujitsu Journal, Fujitsu Limited, vol. 55, No. 6, pp. 575-579.
Japanese Patent Office Action issued Sep. 13, 2011 in Application No. 2006-297666.
Patent Abstracts of Japan, Publication No. 2006-244339, Published Sep. 14, 2006.
Patent Abstracts of Japan, Publication No. 2006-201903, Published Aug. 3, 2006.
Patent Abstracts of Japan, Publication No. 2006-079181, Published Mar. 23, 2006.
Patent Abstracts of Japan, Publication No. 2006-067575, Published Mar. 9, 2006.
Patent Abstracts of Japan, Publication No. 2006-039722, Published Feb. 9, 2006.
Patent Abstracts of Japan, Publication No. 2005-085188, Published Mar. 31, 2005.
Patent Abstracts of Japan, Publication No. 2005-033572, Published Feb. 3, 2005.
Patent Abstracts of Japan, Publication No. 2003-198527, Published Nov. 11, 2003.
Patent Abstracts of Japan, Publication No. 2003-131950, Published May 9, 2003.
Patent Abstracts of Japan, Publication No. 10-065662, Published Mar. 6, 1998.
Patent Abstracts of Japan, Publication No. 61-141231, Published Jun. 28, 1986.

* cited by examiner

INFORMATION PROCESSING APPARATUS PLAYING ENCRYPTED CONTENT DISTRIBUTED THROUGH NETWORK

CROSS-REFERENCE TO RELATED APPLICATIONS

This application is based upon and claims the benefits of priority from the prior Japanese Patent Application No. 2006-297666, filed on Nov. 1, 2006, the entire contents of which are incorporated herein by reference.

BACKGROUND

1. Field

The present embodiment relates to information processing apparatuses which can play content, and particularly to an information processing apparatus which can play content distributed through a network.

2. Description of the Related Art

Digital broadcasting, which broadcasts digitally encoded content, has begun spreading in recent years. Digital broadcasting has a higher communication efficiency than analog broadcasting and can distribute high-quality content even in a limited communication band. In addition, it is easy to perform a variety of information processing on the content.

On the other hand, because a reproduction of digital content will not lower the quality, the protection of digital content is more important than the protection of analog content. Accordingly, much digital content is encrypted, and television sets supporting digital broadcasting incorporate a circuit for performing decryption processing. Personal computers (PCs) supporting digital broadcasting incorporate hardware including a television tuner and a circuit for performing decryption processing (refer to Japanese Unexamined Patent Application Publication No. 2003-198527).

From the viewpoint of convenience and flexibility in viewing content, content distribution through a network is expected, besides broadcasting. Distribution through a network will make it easy for the user to view content when he or she wants it (on-demand distribution). Moreover, it will be easy to distribute different content according to the user (refer to Japanese Unexamined Patent Application Publication No. 2004-54913).

In comparison with broadcasting, content distribution through a network has not yet come into wide use. A general apparatus for playing content distributed through a network is a PC, but it is difficult for the PC to combine content protection with user's convenience. As a general-purpose information processing apparatus, the PC cannot eliminate a possibility that content is used without authorization beyond the approved range by software tampered with. A PC equipped with specialized hardware to play content (refer to Japanese Unexamined Patent Application Publication No. 2003-158514) cannot support a variety of types of content with flexibility, wasting the versatility of the PC.

Currently under development is such a technology that allows content to be played by software, taking content protection into consideration, just by adding minimum hardware to the PC. For instance, one known technology uses hardware that continuously checks whether software being used to play content is authorized software distributed by a distributor (refer to Japanese Unexamined Patent Application Publication No. 2004-129227). The hardware should have such a characteristic that internally stored content cannot be referenced or updated from the outside (tamper resistance). This makes it possible to block unauthorized use of content by software tampered with and to achieve both content protection and user convenience.

The technology disclosed in Japanese Unexamined Patent Application Publication No. 2003-158514 can protect content from unauthorized use by software tampered with but cannot eliminate a possibility that the processing for playing encrypted content is analyzed. Because a software program for playing content is expanded on memory during playback, a user-created program can monitor the operation and can analyze the processing. If a decryption key or a decryption algorithm for use in content decryption is analyzed, content would be freely decrypted and used by the user.

SUMMARY

It is an aspect of the embodiments discussed herein to provide an information processing apparatus capable of playing content distributed through a network, the information processing apparatus including a secure module having tamper resistance including a key storage block storing a decryption key for use in decryption of encrypted content, which is distribution data, a decryption block receiving the distribution data and decrypting the distribution data to obtain the content by using the decryption key stored in the key storage block; and an encryption block dividing the content obtained by the decryption in the decryption block into a plurality of split pieces of content, for encrypting each of the split pieces of content by using a temporary encryption key to be changed at prescribed time intervals, outputting the result as internal transmission data, and outputting information on a temporary decryption key for use in decryption of the internal transmission data each time the temporary encryption key is changed, receiving unit receiving the distribution data distributed through the network and transferring the distribution data to the decryption block in the secure module, and playback unit obtaining the internal transmission data and the information on the temporary decryption key output from the encryption unit in the secure module, decrypting the internal transmission data to obtain the split pieces of content by using the temporary decryption key, and playing the content by combining the plurality of split pieces of content obtained by the decryption.

DESCRIPTION OF THE PREFERRED EMBODIMENTS

Embodiments will be described in detail with reference to the drawings. An overview of the embodiments will be described first, and then the embodiments will be described in detail.

Figure 1:
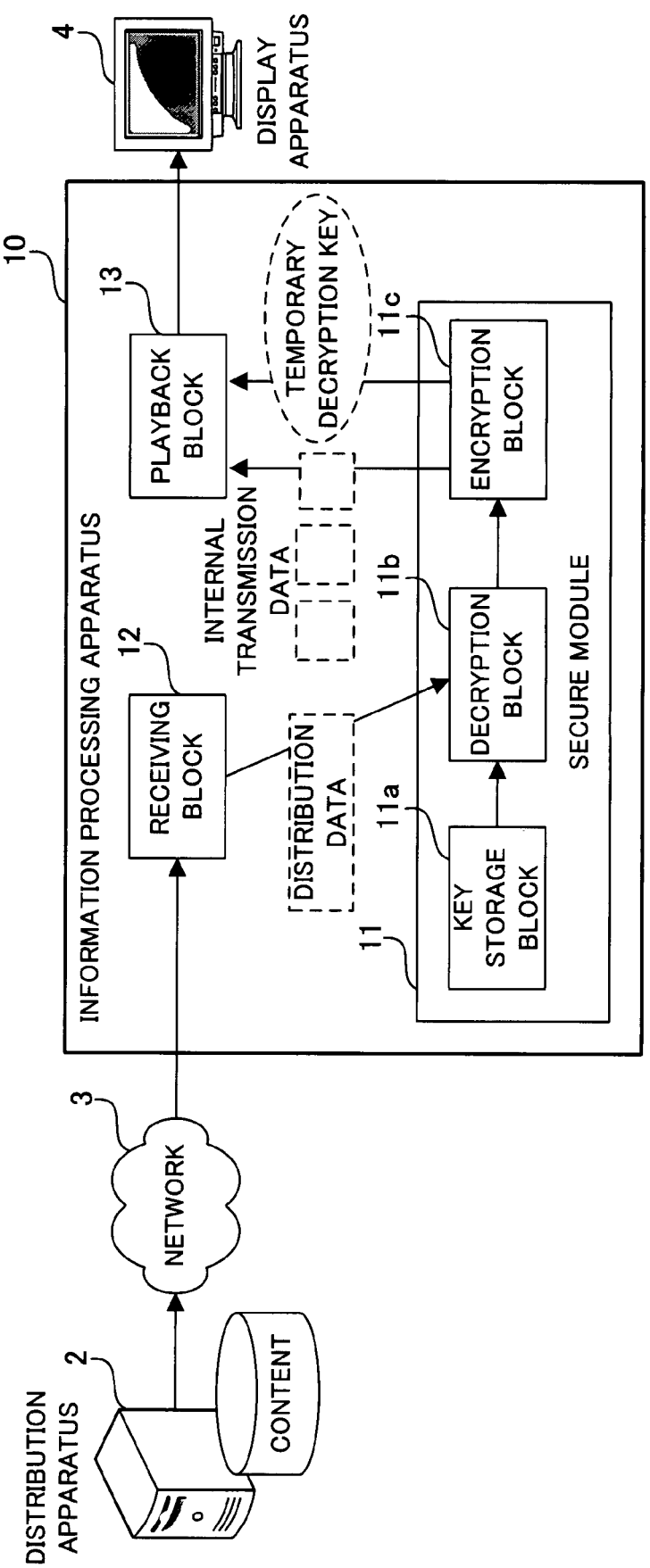
FIG. 1 shows an overview of embodiments.

FIG. 1 is a view showing an overview of the embodiments. An information processing apparatus 10 shown in FIG. 1 receives distribution data distributed by a distribution apparatus 2 through a network 3, decrypts the data to obtain content, and displays the content on a display apparatus 4. The information processing apparatus 10 includes a secure module 11, a receiving block 12, and a playback block 13. The secure module 11 has tamper resistance and contains a key storage block 11a, a decryption block 11b, and an encryption block 11c.

The key storage block 11a stores a decryption key for use in decryption of the distribution data. The distribution data is content encrypted by the distribution apparatus 2. The key storage block 11a stores beforehand the decryption key, which corresponds to the encryption key to be used in encryption of the content by the distribution apparatus 2. If the common key encryption system is adopted to the encryption processing, the decryption key is the same as the encryption key.

The decryption block 11b receives distribution data input from the outside of the secure module 11, decrypts the distribution data to obtain content by using the decryption key stored in the key storage block 11a. The procedure of decryption processing executed by the decryption block 11b should be specified in advance to correspond to the procedure of encryption processing executed by the distribution apparatus 2.

The encryption block 11c divides the content decrypted by the decryption block 11b into a plurality of split pieces of content. The encryption block 11c encrypts the individual split pieces of content by using a temporary encryption key and outputs the result as internal transmission data to the outside of the secure module 11. The temporary encryption key is an encryption key changed at prescribed time intervals. When the temporary encryption key to be used in encryption of the split pieces of content is changed, the encryption block 11c outputs information on the corresponding temporary decryption key to the outside of the secure module 11.

The receiving block 12 receives the distribution data from the distribution apparatus 2 through the network 3. The receiving block 12 transfers the received distribution data to the decryption block 11b in the secure module 11.

The playback block 13 obtains the internal transmission data output from the encryption block 11c in the secure module 11. The playback block 13 obtains also the information of the temporary decryption key output by the encryption block 11c at prescribed time intervals. The playback block 13 then decrypts the internal transmission data to obtain split pieces of content by using the latest temporary decryption key and reproduces the content by combining the plurality of split pieces of content. The playback block 13 plays the reproduced content and displays the content on the display apparatus 4.

In FIG. 1, the playback block 13 outputs the content to the display apparatus 4. If the content contains a sound part, the playback block 13 outputs the content also to a sound output apparatus, which is not shown. Processing to play sound-only content can be implemented in the same way.

In the information processing apparatus 10 as described above, the receiving block 12 receives distribution data distributed from the distribution apparatus 2 through the network 3 and transfers the data to the decryption block 11b. In the secure module 11, the decryption block 11b decrypts the distribution data to obtain content by using the decryption key. The encryption block 11c in the secure module 11 divides the content into a plurality of split pieces of content and encrypts the individual split pieces of content by using a temporary encryption key. Each time the temporary encryption key is changed, the information on the corresponding temporary decryption key is output. Then, the playback block 13 decrypts the encrypted pieces of content by using the temporary decryption key, combines the plurality of decrypted pieces of content, and plays the content.

Accordingly, the user cannot know the decryption key, the decryption algorithm, or the re-encryption algorithm even by analyzing the contents of the memory of the information processing apparatus 10 during playback of the content. Even if the user catches the temporary decryption key, the range of the influence can be minimized because the key is changed at prescribed time intervals. In addition, because the secure module 11 does not need to store the content, the storage area that should be provided in the secure module 11 can be minimized, and the circuit scale can be suppressed.

If the secure module 11 does not have a sufficient processing capability for decryption, the decryption processing can be executed by the playback block 13. More specifically, the information processing apparatus may be configured such that the decryption block 11b does not perform decryption processing, the encryption block 11c outputs double-encrypted internal transmission data, and the playback block 13 performs decryption processing by using the temporary decryption key and the decryption key. In that case, the information processing apparatus 10 can receive and play content exceeding the processing capability of the secure module 11 and can support a greater variety of encryption algorithms.

One Embodiment

One embodiment will be described in detail with reference to figures.

Figure 2:
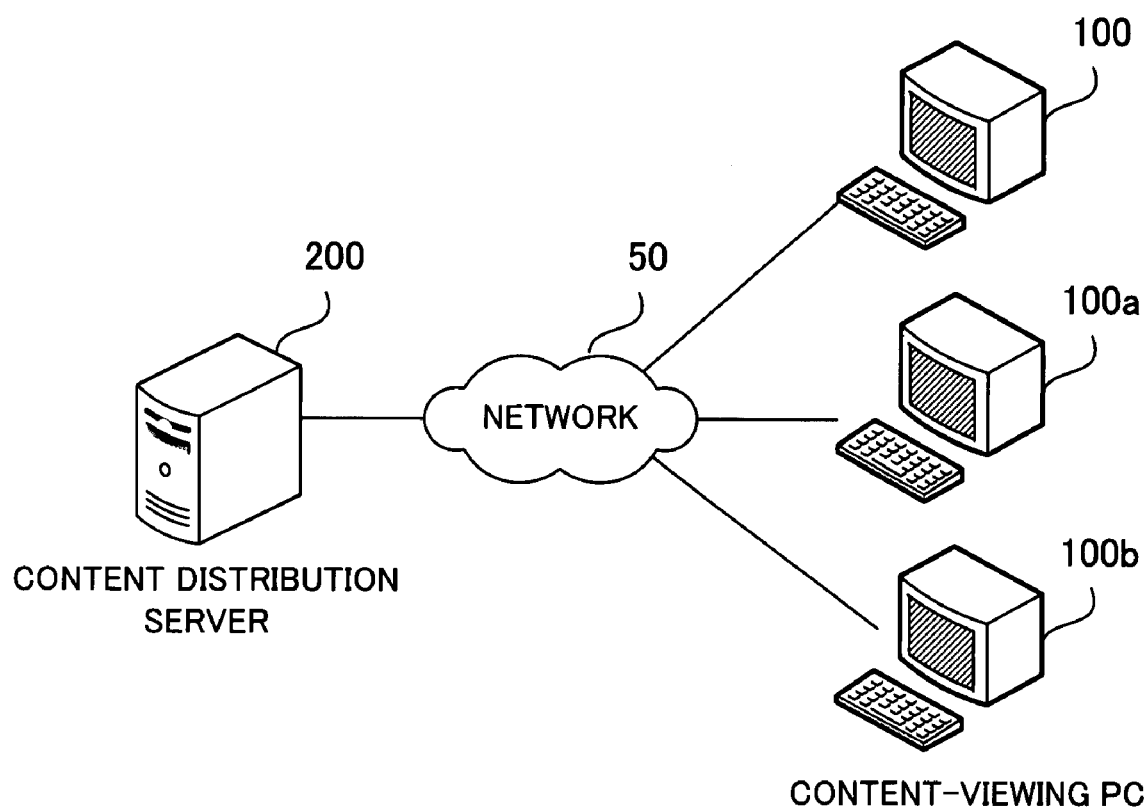
FIG. 2 shows the system structure of a content distribution system.

FIG. 2 is a view showing a system structure of a content distribution system. The content distribution system of one embodiment allows the user to view content distributed through a network on a PC. The content distribution system shown in FIG. 2 includes content-viewing PCs 100, 100a, and 100b, a content distribution server 200, and a network 50. The content-viewing PCs 100, 100a, and 100b are connected to the content distribution server 200 through the network 50.

The content-viewing PCs 100, 100a, and 100b are PCs operated by users. The content-viewing PCs 100, 100a, and 100b include hardware and software included in ordinary PCs and hardware and software required to view content distributed through a network.

The users can use the content-viewing PCs 100, 100a, and 100b both as ordinary PCs and as PCs for viewing content. When the users input instructions to start viewing content, the content-viewing PCs 100, 100*a*, and 100*b* send viewing requests to the content distribution server 200 through the network 50.

When the content distribution server 200 receives the viewing requests from the content-viewing PCs 100, 100*a*, and 100*b*, the content distribution server 200 searches retained pieces of content for the requested pieces of content. The content distribution server 200 distributes the requested pieces of content through the network 50 to the sources of the viewing requests. The content distribution server 200 distributes encrypted content in order to prevent unauthorized use of the content. If necessary, the content distribution server 200 checks whether each user has a right to view the content.

A hardware structure of the content-viewing PCs 100, 100*a*, and 100*b* and the content distribution server 200 will next be described.

Figure 3:
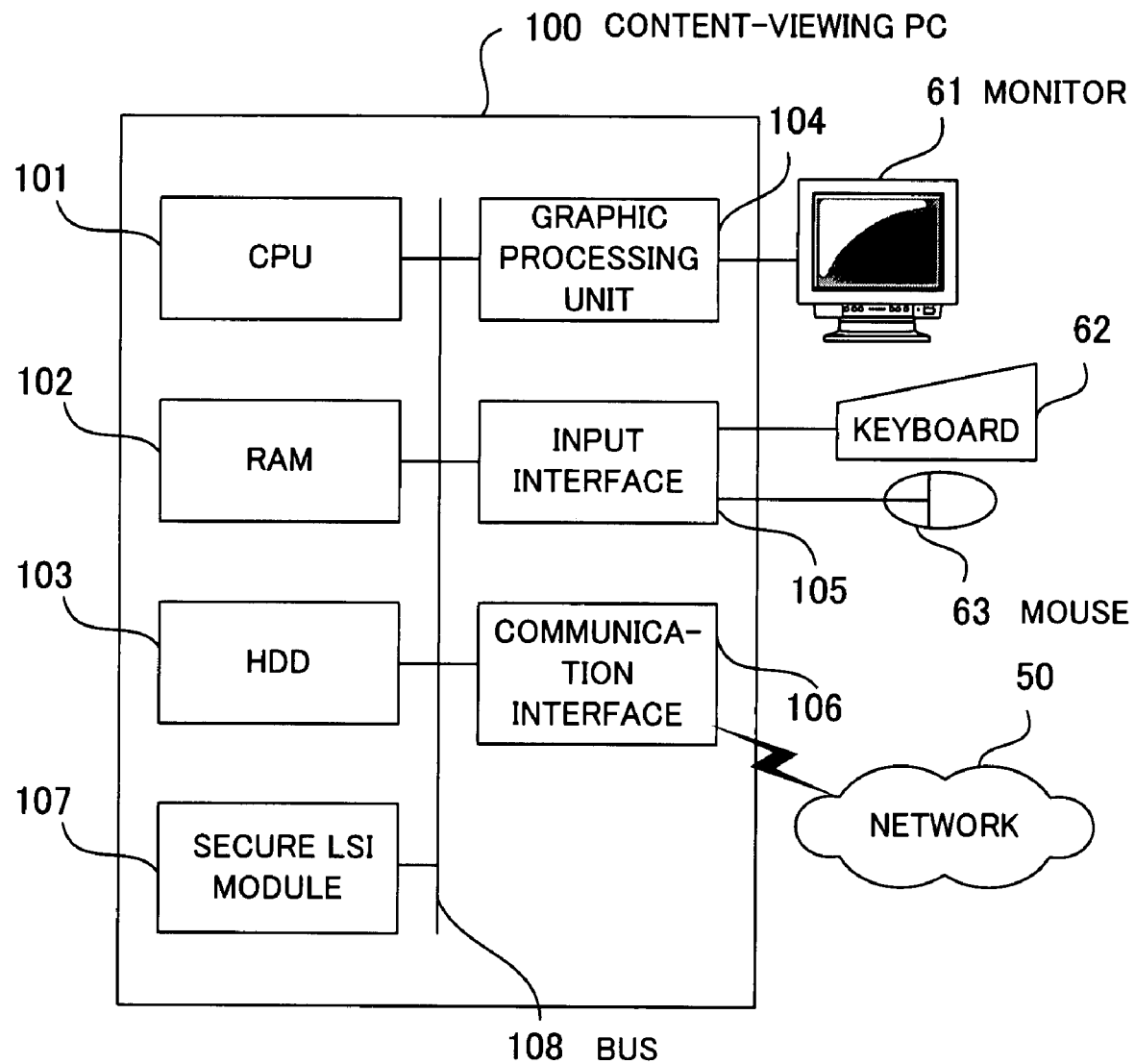
FIG. 3 shows the hardware structure of a content-viewing PC according to one embodiment.

FIG. 3 is a view showing the hardware structure of the content-viewing PC 100. The content-viewing PC 100 has a central processing unit (CPU) 101, which controls the entire apparatus. The CPU 101 is connected through a bus 108 to a random access memory (RAM) 102, a hard disk drive (HDD) 103, a graphic processing unit 104, an input interface 105, a communication interface 106, and a secure large-scale-integration (LSI) module 107.

The RAM 102 temporarily stores at least a part of an application program and an operating system (OS) program to be executed by the CPU 101. The RAM 102 also stores a variety of data needed for the processing by the CPU 101. The HDD 103 stores the OS program and the application program.

The graphic processing unit 104 is connected to a monitor 61. The graphic processing unit 104 displays an image on the screen of the monitor 61 according to instructions from the CPU 101. The input interface 105 is connected to a keyboard 62 and a mouse 63. The input interface 105 sends a signal sent from the keyboard 62 or the mouse 63, through the bus 108 to the CPU 101. The communication interface 106 is connected to the network 50.

The secure LSI module 107 contains a secure area having tamper resistance. The secure area stores information which needs to be protected from an unauthorized program. Processing that needs to be prevented from being analyzed is executed in the secure area. The secure LSI module 107 can read a program or data stored in the RAM 102. The secure LSI module 107 can also write data into the RAM 102.

The content-viewing PCs 100*a* and 100*b* and the content distribution server 200 can be implemented by the same hardware structure as the content-viewing PC 100. The content distribution server 200, however, does not need to include the secure LSI module 107. With the hardware structure described above, processing functions of the embodiment can be implemented.

A module structure of the content-viewing PCs 100, 100*a*, and 100*b* and the content distribution server 200 will next be described.

Figure 4:
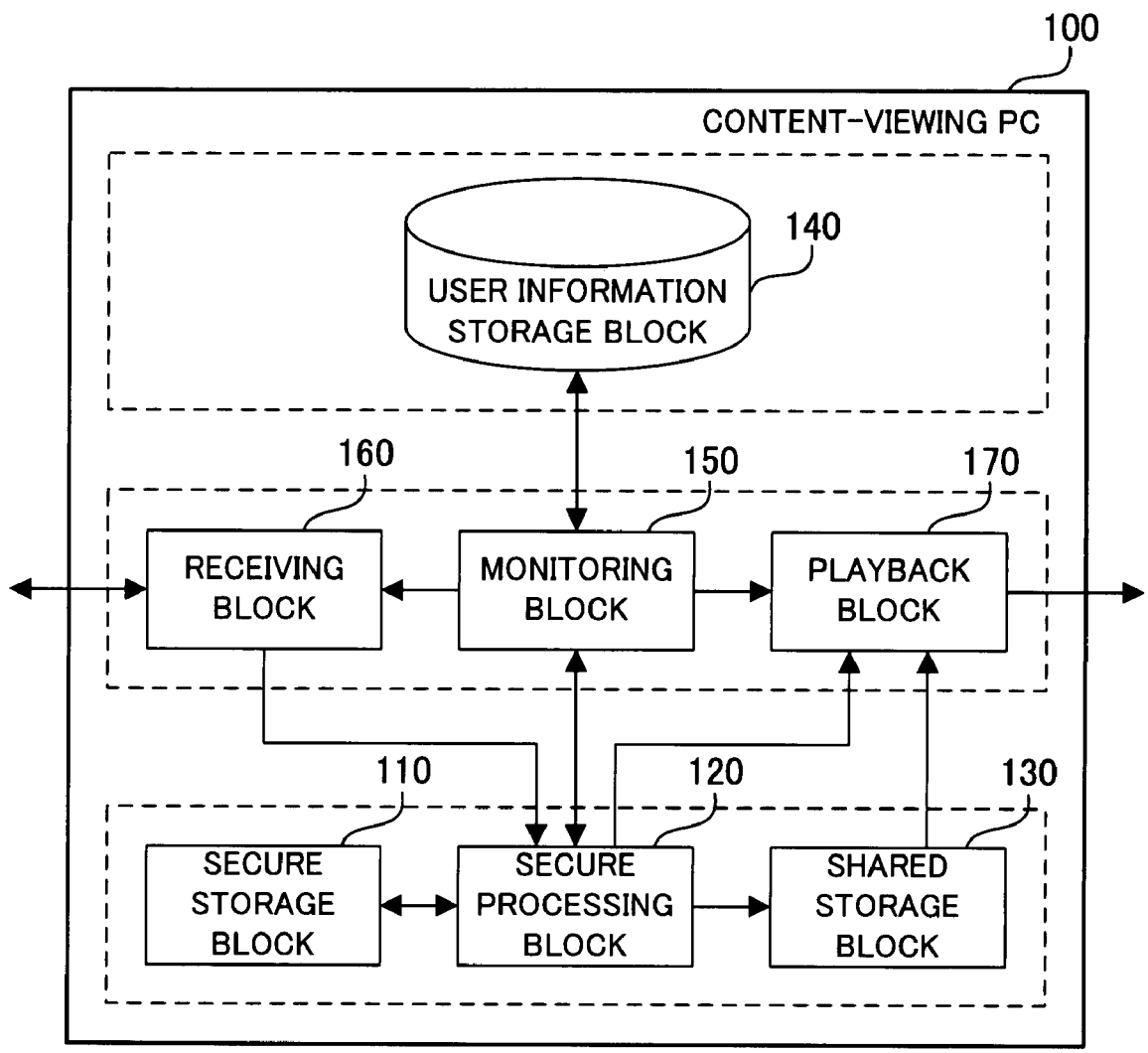
FIG. 4 is a block diagram showing functions of the content-viewing PC according to one embodiment.

FIG. 4 is a block diagram showing functions of the content-viewing PC 100 according to one embodiment. The content-viewing PC 100 includes a secure storage block 110, a secure processing block 120, a shared storage block 130, a user information storage block 140, a monitoring block 150, a receiving block 160, and a playback block 170. The receiving block 160 can communicate with the content distribution server 200 through the network 50. The playback block 170 can display content during playback on the screen of the monitor 61.

The secure storage block 110, the secure processing block 120, and the shared storage block 130 are implemented by the secure LSI module 107. The secure storage block 110 and the secure processing block 120 are implemented in the secure area having tamper resistance. The user information storage block 140 is implemented by the HDD 103. The monitoring block 150, the receiving block 160, and the playback block 170 are implemented by the CPU 101.

The secure storage block 110 stores information required to decrypt the distribution data distributed from the content distribution server 200. The secure storage block 110 stores also information for use in checking whether user information or the processing function of the monitoring block 150 or the playback block 170 has been tampered with. The information stored in the secure storage block 110 is placed in the secure area and cannot be referenced directly from the CPU 101 and so forth.

When the secure processing block 120 receives the distribution data from the receiving block 160, the secure processing block 120 performs decryption processing with reference to the information stored in the secure storage block 110, and divides the decrypted content into split pieces of content having a prescribed data length. The secure processing block 120 then encrypts the split pieces of content by using the temporary encryption key, which is changed periodically, and outputs the result as internal transmission data to the playback block 170. The secure processing block 120 stores the temporary decryption key for use in decryption of the internal transmission data in the shared storage block 130.

In addition, the secure processing block 120 performs management of the user information and checks whether the processing functions of the monitoring block 150 and the playback block 170 have not been tampered with, with reference to the information stored in the secure storage block 110. The processing functions of the secure processing block 120 are placed in the secure area, and their specific procedures cannot be analyzed by the CPU 101 and so forth.

The shared storage block 130 stores the temporary decryption key for use in decryption of the internal transmission data encrypted by the secure processing block 120. The information stored in the shared storage block 130 can be referenced and updated from both the secure processing block 120 and the playback block 170.

The user information storage block 140 stores the user information. The user information includes a user ID assigned beforehand by a content provider, information on the hardware and software included in the content-viewing PC 100, and information on a content viewing history. The user information is encrypted and stored in the user information storage block 140.

The monitoring block 150 continuously monitors processing execution status in the content-viewing PC 100. To be more specific, the monitoring block 150 monitors processes executed in the content-viewing PC 100, operation input by the user, and communication with another computer. If processing unrelated to the playback of content is detected, the monitoring block 150 reports the fact to the secure processing block 120 and makes a request to stop the decryption processing.

The monitoring block 150 gives the secure processing block 120 an instruction to update the user information, in accordance with operation input by the user or content playback status. At a request sent from the secure processing block 120, the monitoring block 150 relays the encrypted user information between the secure processing block 120 and the user information storage block 140.

When the user gives an instruction to view content, the receiving block 160 sends a content distribution request to the content distribution server 200. The receiving block 160 receives encrypted content, or the distribution data, from the content distribution server 200 and transfers the received distribution data to the secure processing block 120. When the content distribution server 200 requests user authentication, the receiving block 160 obtains the user information through the secure processing block 120 and performs user authentication processing by using the obtained user information.

The playback block 170 receives the internal transmission data output from the secure processing block 120, obtains the temporary decryption key from the shared storage block 130, and decrypts the internal transmission data to obtain split pieces of content. The playback block 170 combines the plurality of split pieces of content to reproduce the content and plays the reproduced content to display it on the monitor 61.

The content-viewing PC 100 and the content distribution server 200 are supposed to use the common encryption system. Therefore, the encryption key and the decryption key are the same data, and the temporary encryption key and the temporary decryption key are the same data. Each key is a fixed-length bit string of 128 bits, for instance.

Figure 5:
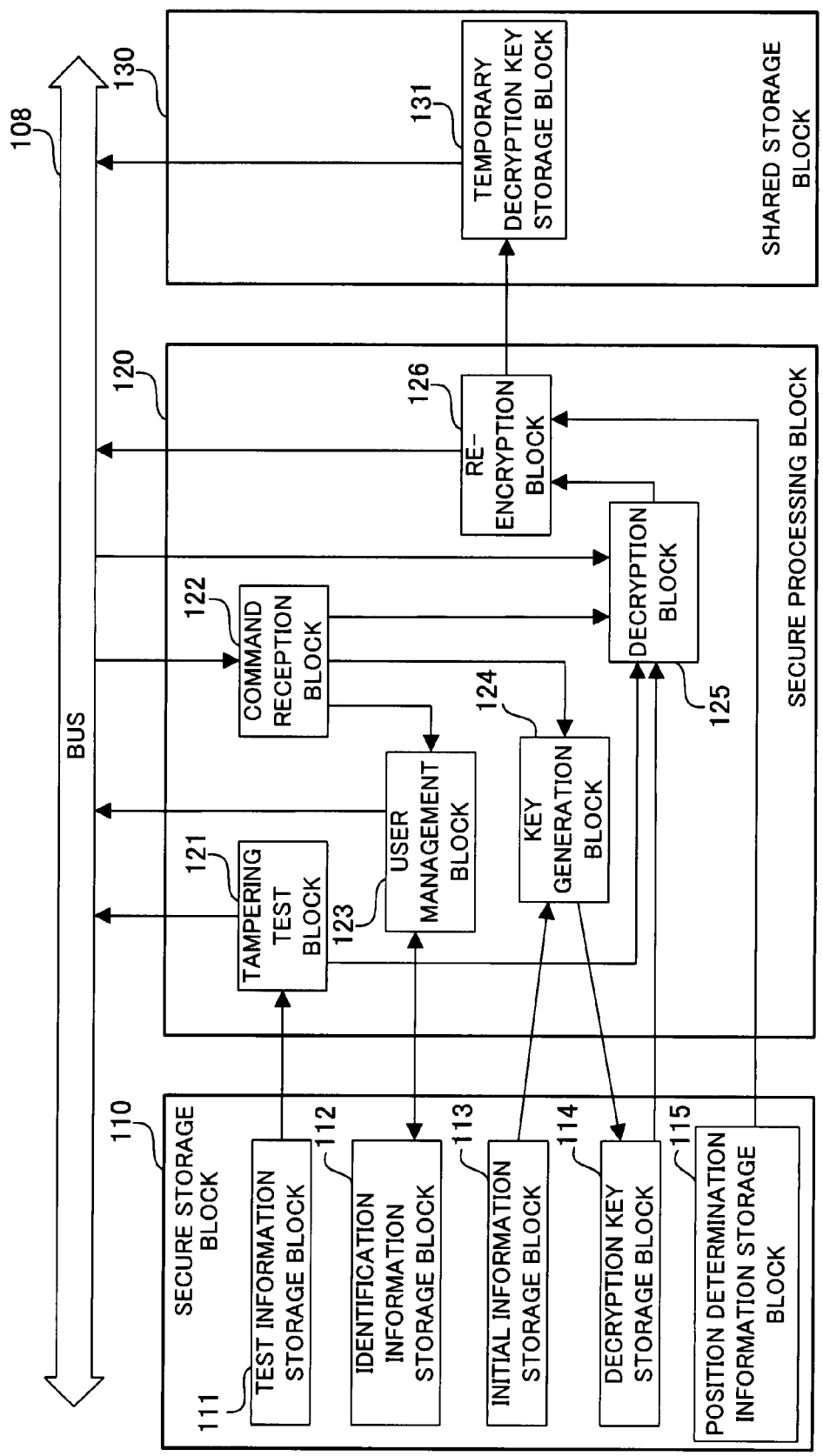
FIG. 5 is a block diagram showing functions of a secure LSI module according to one embodiment.

FIG. 5 is a block diagram showing functions of the secure LSI module 107 according to one embodiment. FIG. 5 shows detailed functions of the secure storage block 110, the secure processing block 120, and the shared storage block 130 implemented in the secure LSI module 107.

The secure storage block 110 includes a test information storage block 111, an identification information storage block 112, an initial information storage block 113, a decryption key storage block 114, and a position determination information storage block 115.

The test information storage block 111 stores beforehand test information for use in checking whether the processing functions of the monitoring block 150 and the playback block 170 have not been tampered with. To be more specific, the test information storage block 111 stores a value calculated from at least a part of a memory image expanded in the RAM 102 when a program for implementing the processing functions of the monitoring block 150 and the playback block 170 is executed. The value calculated here should be set to change when a part of the program is tampered with.

The identification information storage block 112 stores beforehand an LSI-module-specific number provided to identify the secure LSI module 107. The stored LSI-module-specific number will not change later. The identification information storage block 112 stores also a hash value calculated from the latest user information. The hash value calculated here should be set to change when a part of the user information is tampered with.

The initial information storage block 113 stores beforehand initial information for use in generation of a new decryption key when the decryption key for use in decryption of the distribution data is changed. The stored initial information is the same as the initial information held in the content distribution server 200 and will not change later.

The decryption key storage block 114 stores a decryption key for use in decryption of the distribution data. The stored decryption key is changed accordingly when the encryption key used by the content distribution server 200 to generate the distribution data in encryption changes.

The position determination information storage block 115 stores beforehand position determination program information for use in determining a storage position of the temporary decryption key in the storage area provided in the shared storage block 130. A plurality of pieces of position determination program information is provided in advance. The position determination information storage block 115 also stores beforehand position decipherment program information for use in decipherment of the storage position of the temporary decryption key, corresponding to each piece of the position determination program information. The position determination program information and the position decipherment program information are fragments of programs, describing the specific procedure of the processing.

The secure processing block 120 includes a tampering test block 121, a command reception block 122, a user management block 123, a key generation block 124, a decryption block 125, and a re-encryption block 126.

Once the monitoring block 150 and the playback block 170 are activated, the tampering test block 121 continuously checks whether any of their processing functions is tampered with. The tampering test block 121 obtains a memory image corresponding to each of the monitoring block 150 and the playback block 170 from the RAM 102, calculates a value from the obtained memory image in accordance with a prescribed calculation method, and compares the value with the test information stored in the test information storage block 111. If the value does not match the information, the tampering test block 121 gives the decryption block 125 an instruction to stop the processing to decrypt the distribution data. If the value matches the information, the tampering test block 121 continues the tampering test.

The command reception block 122 receives a command from the outside of the secure processing block 120 and calls the user management block 123, the key generation block 124, or the decryption block 125, in accordance with the type of the command. To be more specific, if a command to obtain user information is received, the command reception block 122 gives the user management block 123 an instruction to obtain the user information. If a command to update the user information is received, an instruction to update the user information is given to the user management block 123, together with the update data. If a command to change the decryption key is received, an instruction to change the decryption key is given to the key generation block 124, together with a change key for use in generation of a decryption key. If a command to stop decryption processing is received, an instruction to stop the decryption processing is given to the decryption block 125.

When an instruction to obtain user information is given from the command reception block 122, the user management block 123 obtains the encrypted data stored in the user information storage block 140, through the monitoring block 150. Then, the obtained encrypted data is decrypted to the user information by a prescribed method. The user management block 123 calculates a hash value from the user information and compares the value with another hash value stored in the identification information storage block 112. If the two values do not match, the user management block 123 reports back to the source of the request, telling that the user information has been tampered with. If the two values match, the user management block 123 outputs the user information to the source of the request, together with the LSI-module-specific number stored in the identification information storage block 112.

When an instruction to update the user information is given from the command reception block 122, the user management block 123 obtains the user information in the same way as described above and updates the user information in accordance with the update data. The user management block 123 calculates a hash value from the updated user information and stores the value in the identification information storage block 112. Then, the user management block 123 encrypts the updated user information and stores the encrypted data in the user information storage block 140, through the monitoring block 150.

When an instruction to change the decryption key is given from the command reception block 122, the key generation block 124 generates a new decryption key based on the initial information stored in the initial information storage block 113 and the change key received from the command reception block 122. To be more specific, for instance, the exclusive OR of the initial information and the change key is specified as the decryption key. The key generation block 124 stores the generated decryption key in the decryption key storage block 114.

The decryption block 125 obtains the distribution data from the receiving block 160 and decrypts the distribution data to obtain content by using the decryption key stored in the decryption key storage block 114. The decryption block 125 outputs the content to the re-encryption block 126. If an instruction to stop the decryption processing is given from the tampering test block 121 or the command reception block 122, the decryption block 125 discards the obtained distribution data and does not perform the decryption processing.

The re-encryption block 126 divides the content obtained from the decryption block 125 into split pieces of content having a prescribed data length. The re-encryption block 126 encrypts the individual split pieces of content by using the temporary encryption key and outputs the result as internal transmission data to the playback block 170. The re-encryption block 126 changes the temporary encryption key at prescribed time intervals.

Each time the temporary encryption key is changed, the re-encryption block 126 stores the corresponding temporary decryption key (actually the same key as the temporary encryption key) in the temporary decryption key storage block 131. In this step, the re-encryption block 126 determines the storage position of the temporary decryption key by selecting one piece of position determination program information stored in the position determination information storage block 115 and executing the processing described in the selected piece of position determination program information. The re-encryption block 126 obtains the position decipherment program information corresponding to the selected piece of position determination program information from the position determination information storage block 115 and sends the information to the playback block 170.

The shared storage block 130 includes the temporary decryption key storage block 131. The temporary decryption key output from the re-encryption block 126 is stored in the temporary decryption key storage block 131. The stored temporary decryption key is read by the playback block 170.

The module structure of the content-viewing PC 100 has been described above. The content-viewing PCs 100a and 100b can be implemented by the same module structure as the content-viewing PC 100.

Figure 6:
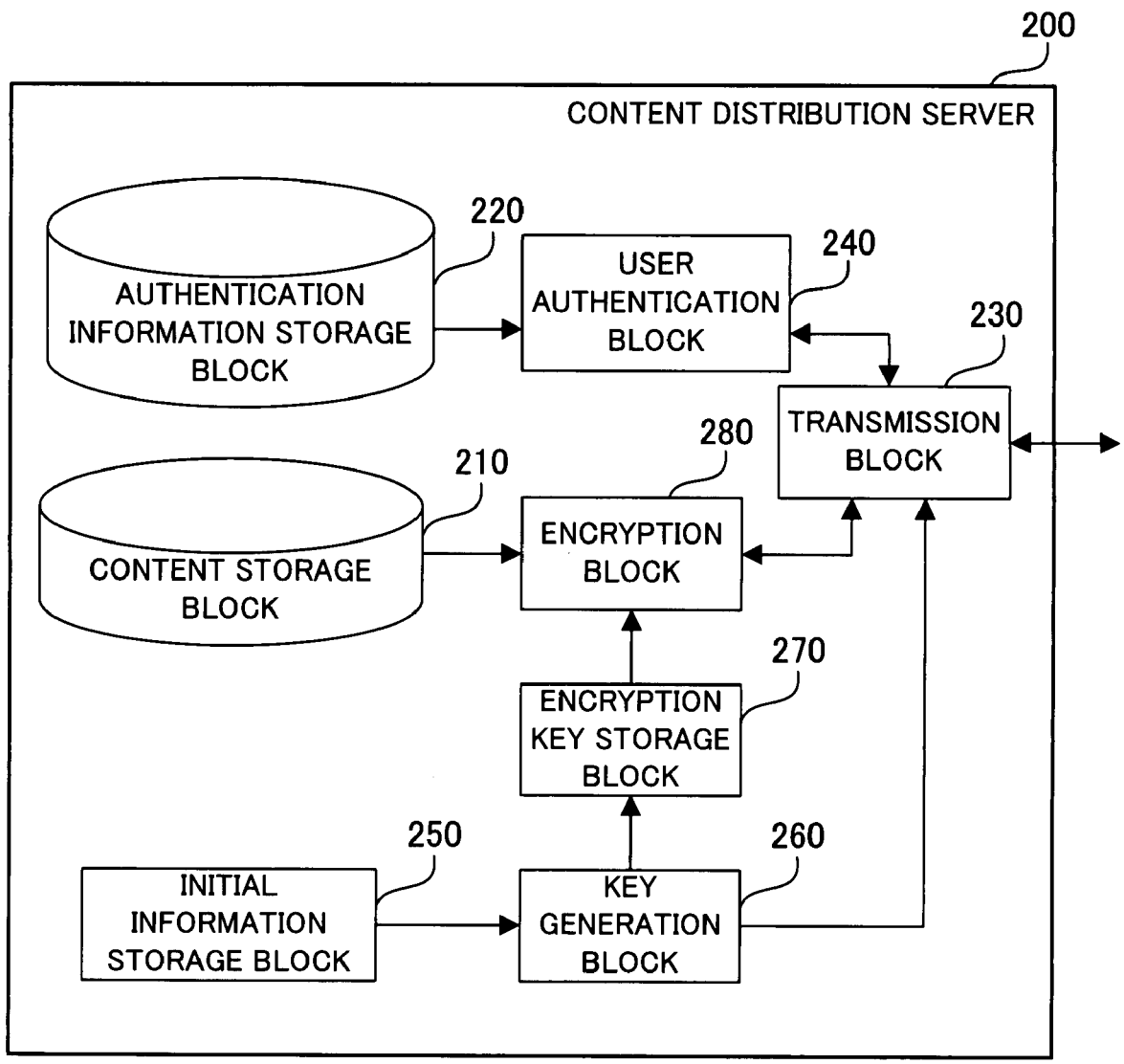
FIG. 6 is a block diagram showing functions of a content distribution server.

FIG. 6 is a block diagram showing functions of the content distribution server 200. The content distribution server 200 includes a content storage block 210, an authentication information storage block 220, a transmission block 230, a user authentication block 240, an initial information storage block 250, a key generation block 260, an encryption key storage block 270, and an encryption block 280. The transmission block 230 can communicate with the content-viewing PCs 100, 100a, and 100b through the network 50.

The content storage block 210 stores beforehand pieces of content as files. Meta-information, or bibliographical information, of content is also stored as required. The content includes moving-picture content, still-picture content, and sound content. The present embodiment is described on the supposition that moving-picture content is distributed.

The authentication information storage block 220 stores authentication information for use in checking whether the user has a right to view content. The authentication information includes a user ID given to each user at a sign-up, an LSI-module-specific number for identifying the secure LSI module, and information on viewable content depending on details of the contract.

When the transmission block 230 receives a content viewing request from the content-viewing PC 100, 100a, or 100b, the transmission block 230 asks for user information, and obtains the information from the source of the viewing request. The transmission block 230 then gives the user authentication block 240 an instruction to authenticate the user. If the user is authenticated successfully, the transmission block 230 gives the encryption block 280 an instruction to encrypt the requested content and sends the encrypted content as distribution data successively to the source of the request. If the user is unsuccessfully authenticated, the transmission block 230 reports the fact to the source of the request.

If the change key for use in changing the encryption key (or changing the decryption key) is received from the key generation block 260, the transmission block 230 sends the change key to the content-viewing PCs 100, 100a, and 100b. To such a content-viewing PC that communication has not yet been established when the change key is received, the change key will be sent later, immediately after communication is established.

When an instruction of user authentication is given from the transmission block 230, the user authentication block 240 compares the obtained information and the authentication information stored in the authentication information storage block 220 for user authentication. For instance, the user authentication block 240 checks whether the user of the source of the request is an authorized user and whether an authorized secure LSI module is used. The user authentication block 240 also checks whether the playback of the requested content is not restricted. Then, the user authentication block 240 sends the result of user authentication to the transmission block 230.

The initial information storage block 250 stores beforehand initial information for use in generation of a new encryption key when the encryption key is changed. The stored initial information is the same as the initial information held in the content-viewing PCs 100, 100a, and 100b and will not change later.

The key generation block 260 changes the encryption key for use in encryption of content at prescribed time intervals. To be more specific, the key generation block 260 first generates a random change key. An encryption key is generated from the initial information stored in the initial information storage block 250 and the generated change key. For example, the key generation block 260 specifies the exclusive OR of the initial information and the change key as the encryption key. Then, the key generation block 260 stores the generated encryption key in the encryption key storage block 270. The key generation block 260 sends the change key to the transmission block 230.

The encryption key storage block 270 stores the latest encryption key generated by the key generation block 260. The stored encryption key is obtained by the encryption block 280.

When an instruction of content encryption is received from the transmission block 230, the encryption block 280 searches through the content storage block 210 for the specified content and obtains the content. The encryption block 280 encrypts the obtained content successively from the beginning by using the encryption key stored in the encryption key storage block 270 and sends the result to the transmission block 230.

Processing executed in the system having the structure and data structure as described above will next be described in detail. In the following description, it is assumed that the user views content by using the content-viewing PC 100. The same processing is executed when the content-viewing PC 100*a* or 100*b* is used.

The flow of PC start-up processing will be described first. After the content-viewing PC 100 starts up, the OS configures the PC in accordance with its use.

Figure 7:
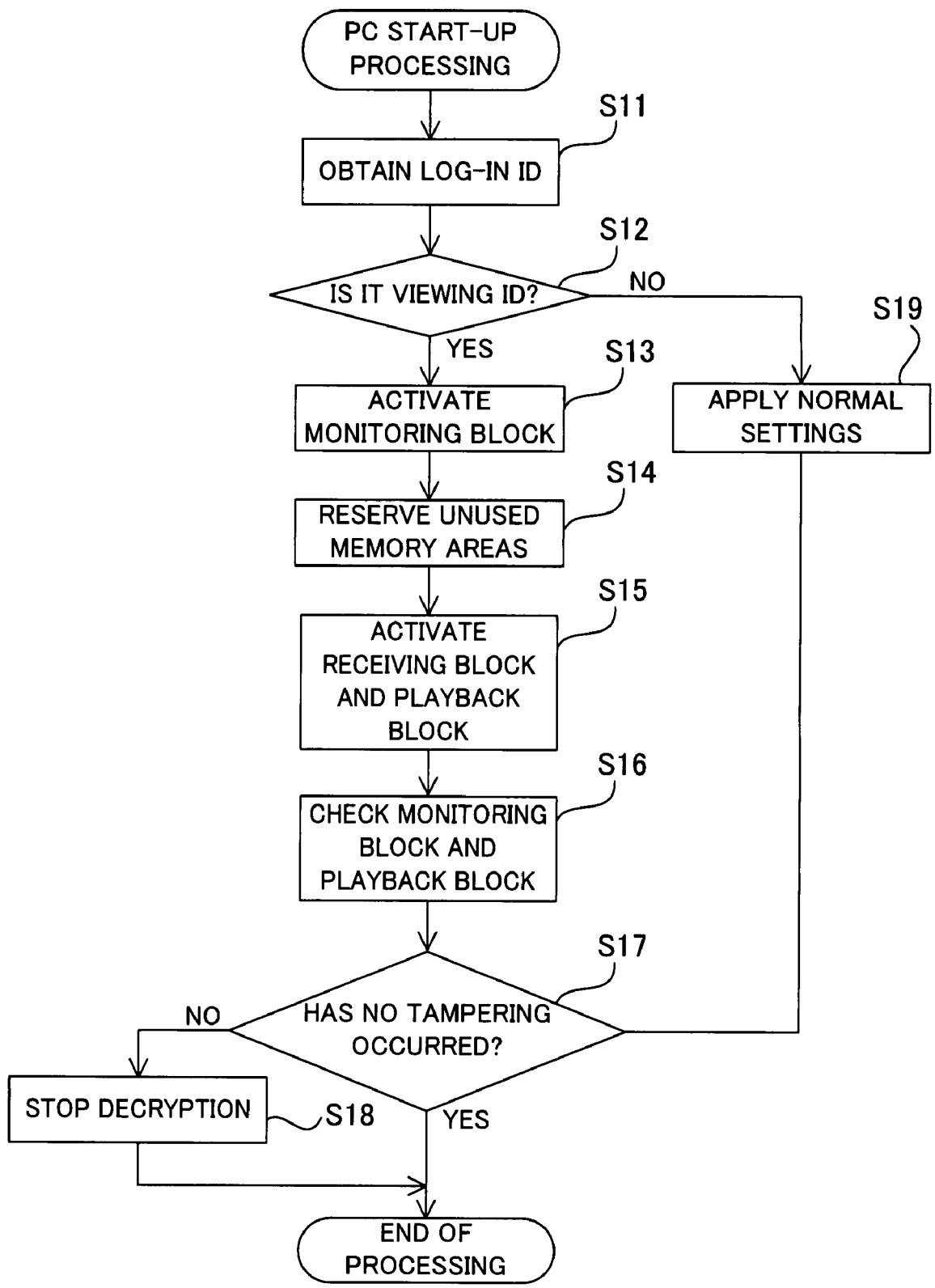
FIG. 7 is a flow chart showing a procedure of PC start-up processing.

FIG. 7 is a flow chart showing the procedure of PC start-up processing. The processing shown in FIG. 7 will be described in order of step number.

Step S11: The CPU 101 starts the OS by executing the OS program stored in the HDD 103. The OS prompts the user to input his or her log-in ID and obtains the input log-in ID.

Step S12: The OS checks whether the input log-in ID is a content viewing ID. The content viewing ID here means a special log-in ID for using the content-viewing PC 100 to view content. The content viewing ID is specified in the OS in advance. If the log-in ID is the content viewing ID, the processing proceeds to step S13. If not, the processing proceeds to step S19.

Step S13: The OS expands a program for implementing the processing function of the monitoring block 150 in the RAM 102 and activates the monitoring block 150. The OS is pre-programmed to activate the monitoring block 150 first if the content viewing ID is used at log-in.

Step S14: The monitoring block 150 reserves all of the memory areas unused at the time of activation, among the memory zone that can be used in the content-viewing PC 100.

Step S15: The monitoring block 150 allocates a memory area of the memory areas reserved in step S14 to the receiving block 160 and activates the receiving block 160. The monitoring block 150 allocates a memory area also to the playback block 170 and activates the playback block 170. If the memory area becomes insufficient later, the playback block 170 requests the monitoring block 150 to allocate an additional memory area.

Step S16: When the receiving block 160 and the playback block 170 are activated in step S15, the tampering test block 121 checks whether tampering has occurred. To be more specific, the tampering test block 121 compares a value calculated from the memory image expanded in the RAM and the test information stored in the test information storage block 111.

Step S17: The tampering test block 121 checks whether the two values compared in step S16 match, or whether tampering has occurred. If there is no tampering, the PC start-up processing ends. If tampering has occurred, the processing proceeds to step S18.

Step S18: If the content has already been played, the tampering test block 121 gives an instruction to stop the decryption processing to the decryption block 125.

Step S19: The OS uses normal setting information and configures the content-viewing PC 100 as a normal PC.

If the content viewing ID is used at log-in, the tampering test block 121 executes the processing of steps S16 to S18 periodically thereafter.

If the content viewing ID is used at log-in, the OS activates the monitoring block 150 first. The monitoring block 150 reserves all unused memory areas. Then, the monitoring block 150 activates the receiving block 160 and the playback block 170. This will block the execution of a process which is not allowed by the monitoring block 150. Then, the tampering test block 121 checks whether the monitoring block 150 or the playback block 170 has been tampered with. If tampering is detected, the tampering test block 121 stops the decryption of the content and logs off. If a normal log-in ID is used at log-in, the OS performs configuration in accordance with the normal setting information.

The flow of PC monitoring processing will next be described. After the monitoring block 150 is activated by the OS, the monitoring block 150 continuously checks whether the content-viewing PC 100 performs unauthorized processing.

Figure 8:
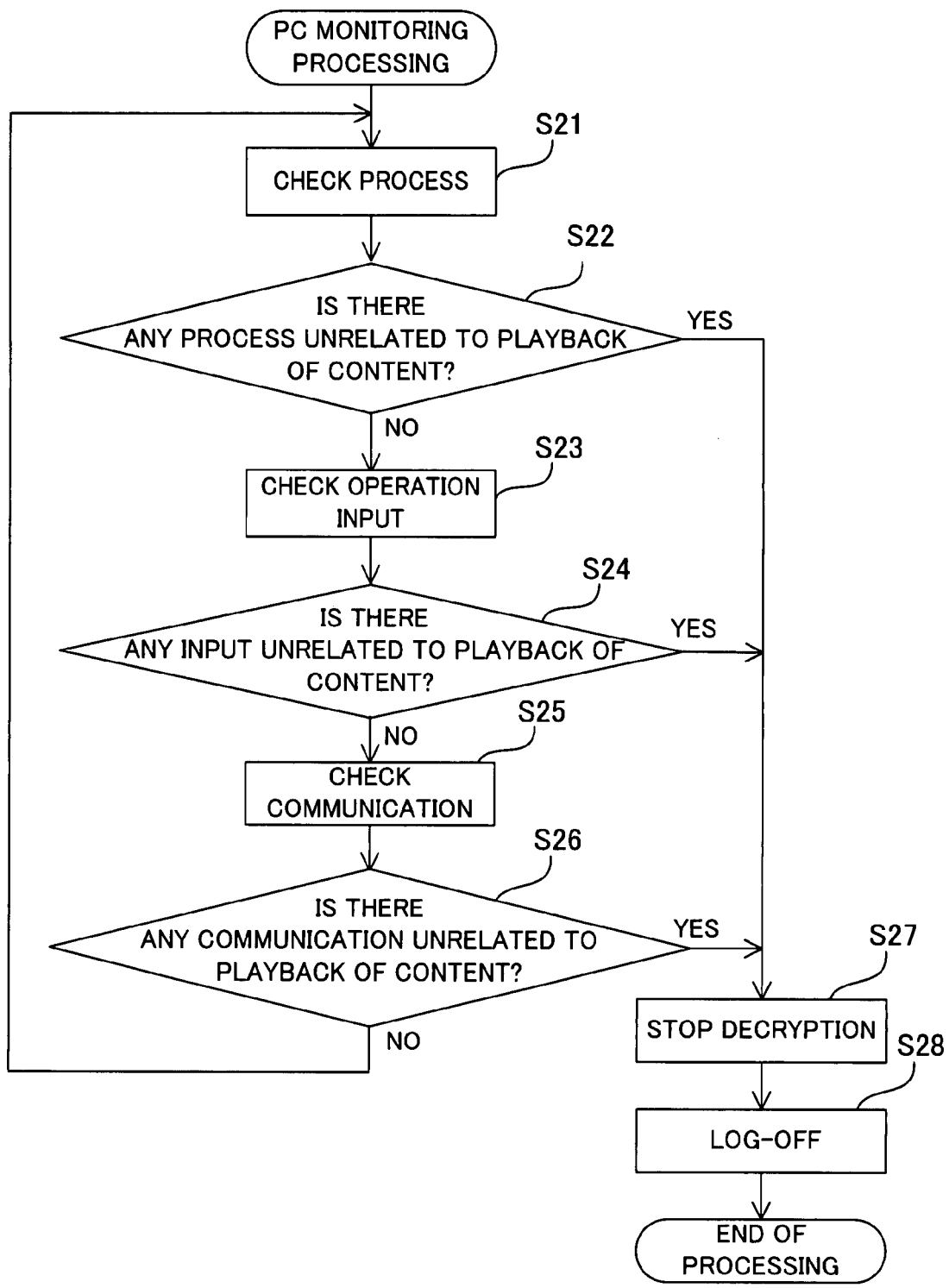
FIG. 8 is a flow chart showing a procedure of PC monitoring processing.

FIG. 8 is a flow chart showing a procedure of PC monitoring processing. The processing shown in FIG. 8 will be described in order of step number.

Step S21: The monitoring block 150 checks process execution status. The information of a process executed by the content-viewing PC 100 is obtained from the OS, for instance.

Step S22: The monitoring block 150 judges whether a process unrelated to the playback of content is being executed, from the result of the test made in step S21. A process unrelated to the playback of content is anything other than processes related to the monitoring block 150, the receiving block 160, the playback block 170, and the OS. If an unrelated process is being executed, the processing proceeds to step S27. If an unrelated process is not being executed, the processing proceeds to step S23.

Step S23: The monitoring block 150 checks operation input by the user. To be more specific, the monitoring block 150 checks input from the keyboard 62 and the mouse 63.

Step S24: The monitoring block 150 judges whether an operation input unrelated to the playback of content has been made, from the result of the test made in step S23. Operation input unrelated to the playback of content is anything other than authorized operation input to the playback block 170. If irrelevant operation input is found, the processing proceeds to step S27. If irrelevant operation input is not found, the processing proceeds to step S25.

Step S25: The monitoring block 150 checks the status of communication by the communication interface 106.

Step S26: The monitoring block 150 determines whether communication unrelated to the playback of content has been made, from the result of the test made in step S25. Communication unrelated to the playback of content is anything other than communication with the content distribution server 200. If irrelevant communication has been made, the processing proceeds to step S27. If irrelevant communication has not been made, the processing proceeds to step S21.

Step S27: The monitoring block 150 outputs an instruction to stop the decryption processing to the command reception block 122. The command reception block 122 gives the decryption block 125 an instruction to stop the decryption processing. The decryption block 125 stops the decryption processing and discards the distribution data obtained thereafter.

Step S28: The monitoring block 150 gives a log-off instruction to the OS. The OS terminates processes corresponding to the monitoring block 150, the receiving block 160, and the playback block 170, and logs off.

If an unauthorized process is executed or if unauthorized operation input or unauthorized communication is made, the monitoring block 150 stops the decryption processing immediately so that log-off is performed. This will reliably prevent the content-viewing PC 100 from performing unauthorized processing, or processing aiming at duplication of the content.

The flow of user information update processing will next be described. The monitoring block 150 updates the user information with information input by the user or the information of the content playback history if necessary.

Figure 9:
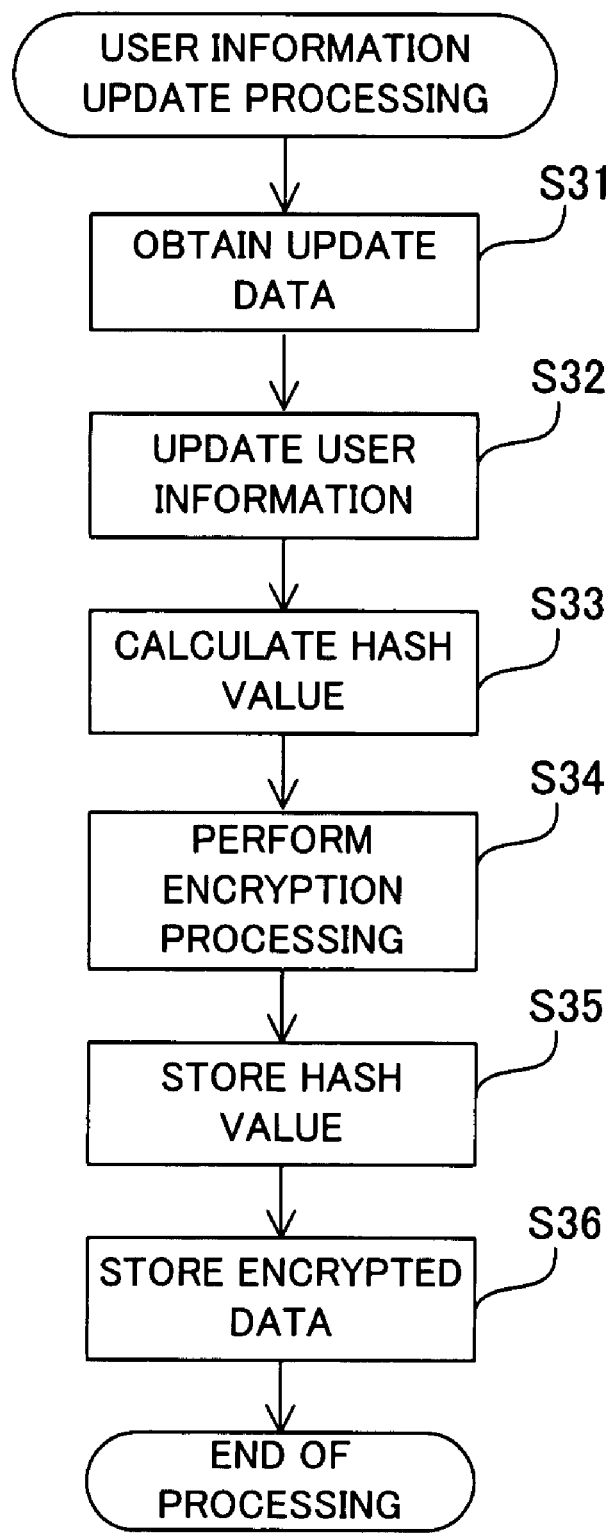
FIG. 9 is a flow chart showing a procedure of user information update processing.

FIG. 9 is a flow chart showing a procedure of the user information update processing. The processing shown in FIG. 9 is described in order of step number.

Step S31: The monitoring block 150 obtains the update data of the user information. To be more specific, the monitoring block 150 obtains information input by the user's operation. When the structure of the hardware or software of the content-viewing PC 100 is changed, the monitoring block 150 obtains the structure information from the OS. When the playback block 170 plays content, the monitoring block 150 obtains the information of the viewing history. The monitoring block 150 outputs the update data of the user information and an update command to the command reception block 122.

Step S32: The command reception block 122 gives the user management block 123 an instruction to update the user information. The user management block 123 obtains the latest encrypted data stored in the user information storage block 140 through the monitoring block 150 and decrypts the data to obtain the user information. The user management block 123 applies the update data to the user information to generate updated user information.

Step S33: The user management block 123 applies a prescribed hash function to the user information generated in step S32 and calculates a hash value.

Step S34: The user management block 123 encrypts the user information generated in step S32 in a prescribed method.

Step S35: The user management block 123 replaces the hash value stored in the identification information storage block 112 with the hash value calculated in step S33.

Step S36: The user management block 123 outputs the encrypted data generated in step S34 to the monitoring block 150. The monitoring block 150 stores the obtained encrypted data in the user information storage block 140.

When information to be added to the user information is obtained, the monitoring block 150 requests the user management block 123 to update the user information. The user management block 123 encrypts the updated user information and stores the information in the user information storage block 140. The user management block 123 calculates a hash value from the updated user information and stores the value in the identification information storage block 112.

The flow of user authentication processing will next be described. When content is distributed, the content distribution server 200 obtains the user information from the content-viewing PC 100 and performs user authentication.

Figure 10:
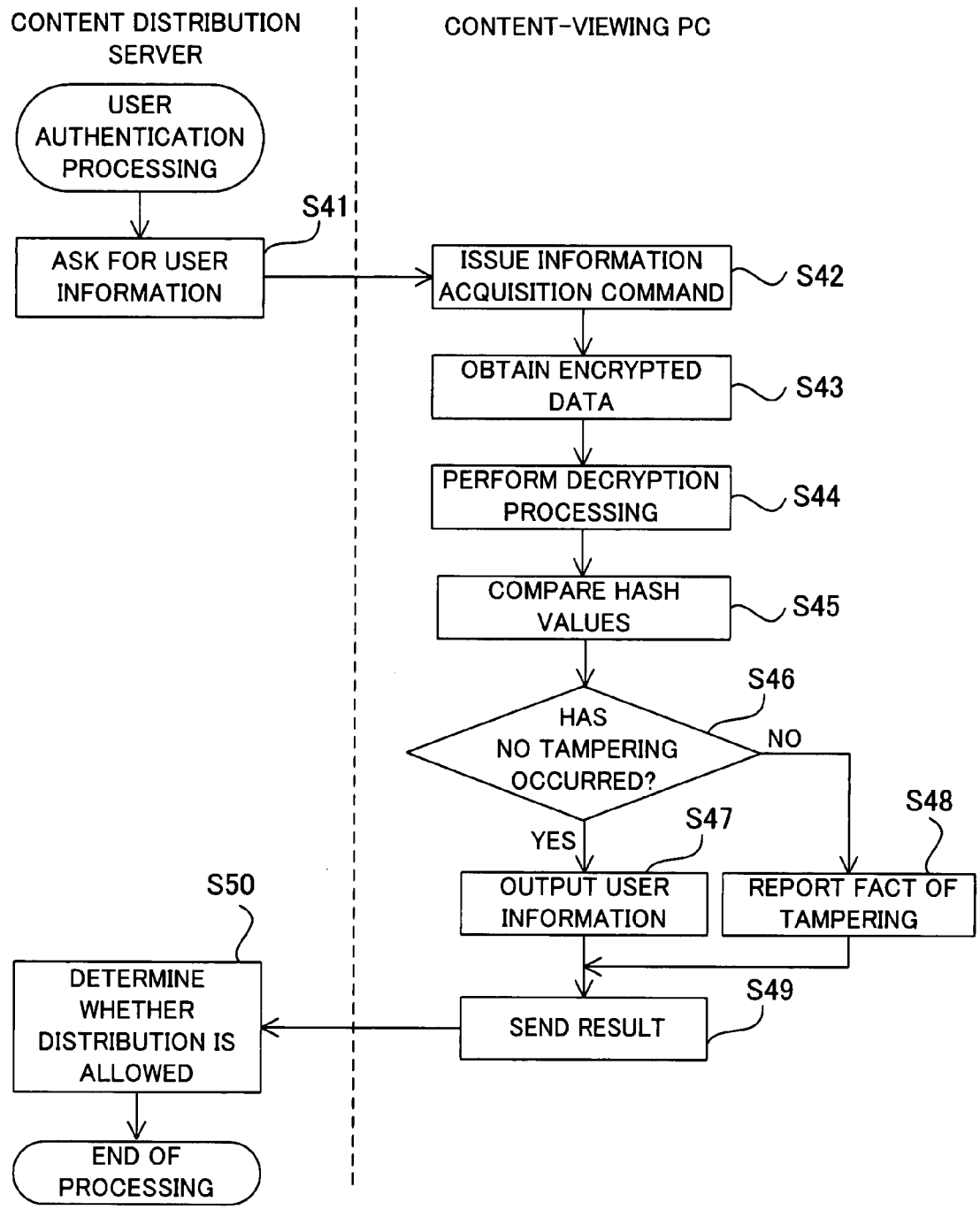
FIG. 10 is a flow chart showing a procedure of user authentication processing.

FIG. 10 is a flow chart showing a procedure of the user authentication processing. The processing shown in FIG. 10 will be described in order of step number.

Step S41: When the content-viewing PC 100 makes a request to view content, the transmission block 230 of the content distribution server 200 sends a request to obtain the user information to the content-viewing PC 100.

Step S42: The receiving block 160 of the content-viewing PC 100 outputs a command to obtain the user information to the command reception block 122.

Step S43: The command reception block 122 gives the user management block 123 an instruction to obtain the user information. The user management block 123 obtains the latest encrypted data stored in the user information storage block 140, through the monitoring block 150.

Step S44: The user management block 123 decrypts the encrypted data obtained in step S43 to obtain the user information in a prescribed method.

Step S45: The user management block 123 calculates a hash value by applying a prescribed hash function to the user information obtained by the decryption in step S44. The user management block 123 compares the calculated hash value and the hash value stored in the identification information storage block 112.

Step S46: The user management block 123 checks whether the two hash values compared in step S45 match, or judges whether the user information has not been tampered with. When not tampered with, the processing proceeds to step S47. If tampered with, the processing proceeds to step S48.

Step S47: The user management block 123 adds the LSI-module-specific number stored in the identification information storage block 112 to the user information obtained by the decryption in step S44 and outputs the result to the receiving block 160.

Step S48: The user management block 123 reports the receiving block 160 that the user information has been tampered with.

Step S49: The receiving block 160 sends the user information obtained in step S47 to the content distribution server 200 or reports the content distribution server 200 that the user information cannot be obtained.

Step S50: If the user information can be obtained from the content-viewing PC 100, the transmission block 230 has the user authentication block 240 execute user authentication processing and judges whether distribution is allowed, from the result of authentication. If the user information cannot be obtained from the content-viewing PC 100, distribution is rejected.

When the content distribution server 200 makes a request to obtain the user information, the receiving block 160 requests the user management block 123 to obtain the user information. The user management block 123 obtains the encrypted user information and decrypts the information. The user management block 123 judges whether tampering has occurred, by checking the hash value of the user information. The user management block 123 outputs the user information only when it has been judged that there is no tampering.

Figure 11:
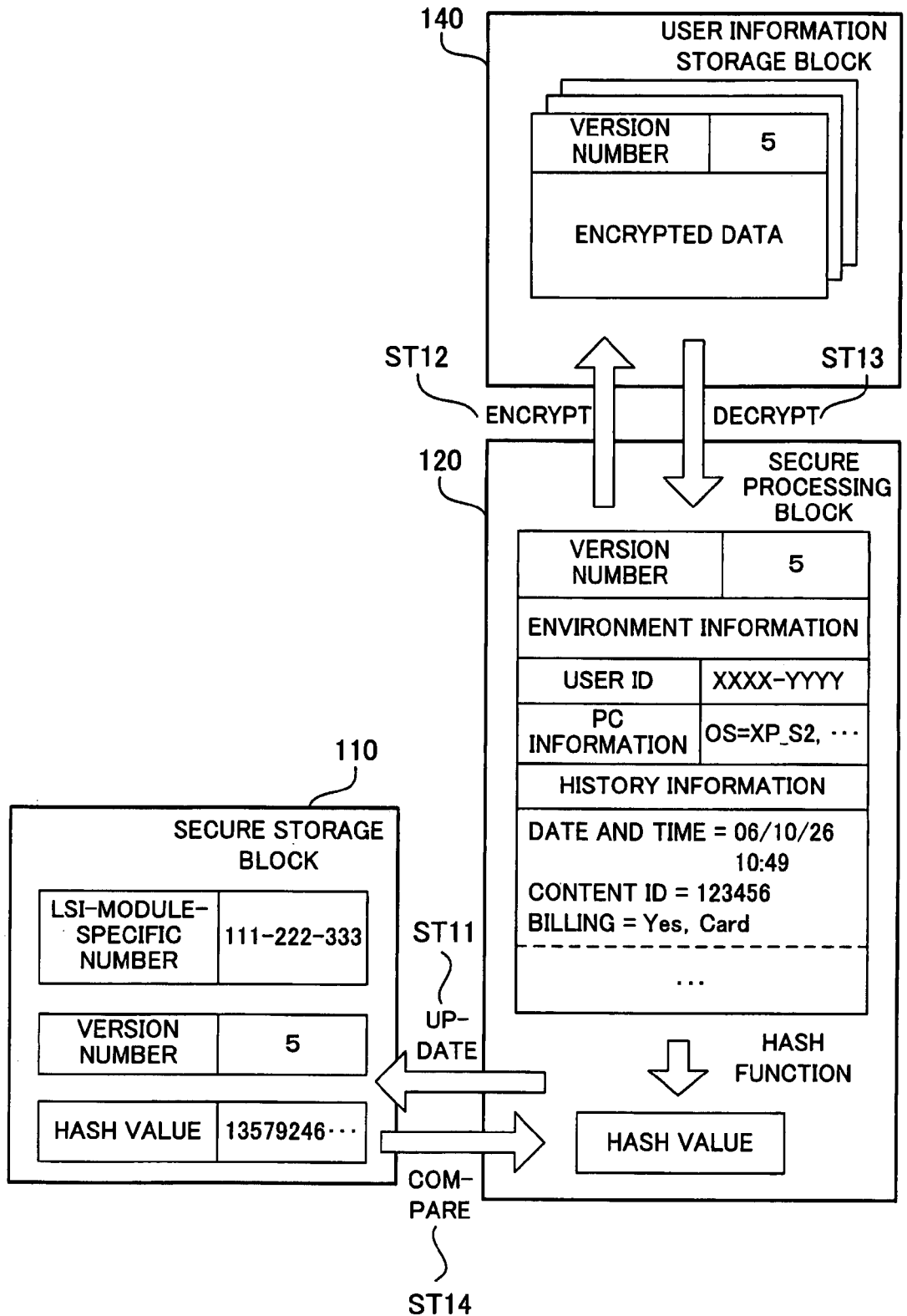
FIG. 11 is a diagram showing the flow of update and acquisition of user information.

FIG. 11 is a diagram showing the flow of update and acquisition of user information.

When the user information is updated, new user information is first created in the secure processing block 120. The user information includes environment information and history information. The environment information includes the user ID and the configuration information of hardware and software, which is called PC information. The history information includes content viewing date and time, content ID, and a billing status. The user information is given a version number indicating the version of the user information. The version number is incremented by one each time the user information is updated.

A hash value of the user information is calculated in the secure processing block 120. The calculated hash value is stored in the secure storage block 110. The version number of the latest user information is also stored in the secure storage block 110 (in step ST11). Then, the user information is encrypted, and the encrypted data is stored in the user information storage block 140 (in step ST12). The user information storage block 140 holds the encrypted data of the latest version together with the encrypted data of older versions. This allows the update status of the user information to be checked later.

When the user information is obtained, the latest encrypted data stored in the user information storage block 140 is copied and decrypted in the secure processing block 120 (in step ST13). A hash value is calculated as in updating. The calculated hash value is compared with the hash value stored in the secure storage block 110 to judge whether tampering has occurred (in step ST14).

Because the user information is stored in the HDD 103 as described above, the minimum information should be stored in the secure storage block 110. The encrypted user information is stored, and whether tampering has occurred is judged by using a hash value in decryption. Accordingly, unauthorized user authentication performed with the user information being tampered with can be prevented.

The flow of decryption key modification processing will next be described. The content distribution server 200 changes the encryption key for use in encryption of content periodically and gives the content-viewing PC 100 an instruction to change the decryption key.

Figure 12:
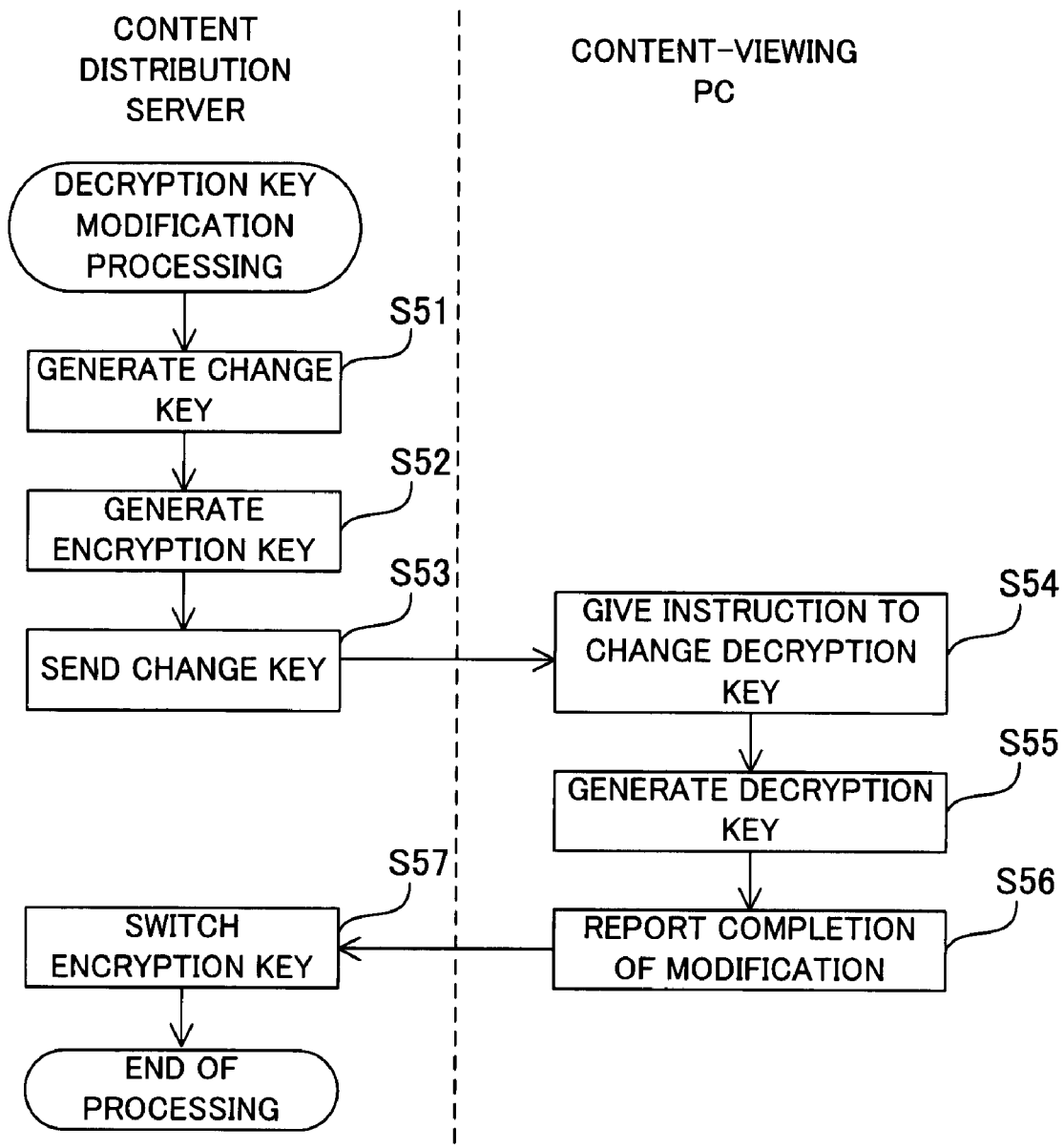
FIG. 12 is a flow chart showing a procedure of decryption key modification processing.

FIG. 12 is a flow chart showing a procedure of the decryption key modification processing. The processing shown in FIG. 12 will be described in order of step number.

Step S51: The key generation block 260 of the content distribution server 200 generates a random change key for generating a new encryption key after a lapse of prescribed time since the preceding modification of the encryption key. The key generation block 260 generates a change key every hour, for instance.

Step S52: The key generation block 260 generates an encryption key from the initial information stored in the initial information storage block 250 and the change key generated in step S51. For instance, the key generation block 260 specifies the exclusive OR of the initial information and the change key as the encryption key. The key generation block 260 then stores the generated encryption key in the encryption key storage block 270.

Step S53: The key generation block 260 sends the change key to the transmission block 230. The transmission block 230 receives the change key and sends the key to the content-viewing PC 100.

Step S54: The receiving block 160 of the content-viewing PC 100 outputs a command to change the decryption key, together with the received change key, to the command reception block 122.

Step S55: The command reception block 122 gives an instruction to generate a decryption key to the key generation block 124. The key generation block 124 generates a decryption key from the initial information stored in the initial information storage block 113 and the obtained change key. Actually, the encryption key is the same as the decryption key. Therefore, the key generation block 124 specifies the exclusive OR of the initial information and the change key as the decryption key, for instance. Then, the key generation block 124 stores the generated decryption key in the decryption key storage block 114.

Step S56: The receiving block 160 reports the content distribution server 200 that the modification of the decryption key has been completed.

Step S57: The transmission block 230 gives an instruction to change the encryption key for use in encryption of content to the encryption block 280. The encryption block 280 obtains the changed encryption key from the encryption key storage block 270 and uses the obtained encryption key in the subsequent encryption of content.

The key generation block 260 of the content distribution server 200 generates an encryption key from the initial information and the change key and gives an instruction to change the decryption key to the content-viewing PC 100. The key generation block 124 of the content-viewing PC 100 generates a decryption key from the initial information and the change key.

The flow of content playback processing will next be described. The content-viewing PC 100 receives distribution data from the content distribution server 200, decrypts the distribution data to obtain content, and plays the content.

Figure 13:
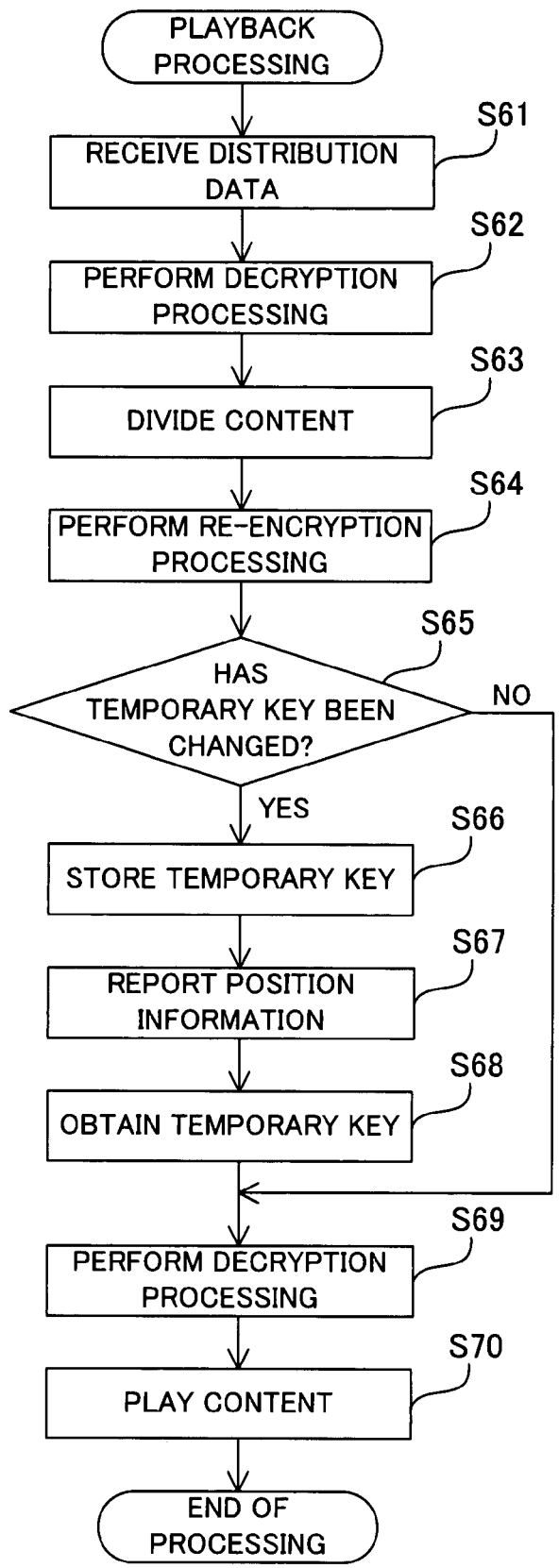
FIG. 13 is a flow chart showing a procedure of playback processing according to one embodiment.

FIG. 13 is a flow chart showing a procedure of playback processing of one embodiment. The processing shown in FIG. 13 will be described in order of step number.

Step S61: The receiving block 160 receives the distribution data from the content distribution server 200 through the network 50. The receiving block 160 then transfers the received distribution data to the decryption block 125.

Step S62: The decryption block 125 decrypts the obtained distribution data by using the decryption key stored in the decryption key storage block 114. The decryption block 125 then outputs the content obtained by the decryption to the re-encryption block 126.

Step S63: The re-encryption block 126 divides the obtained content to split pieces of content having a prescribed data length.

Step S64: The re-encryption block 126 encrypts the individual pieces of content divided in step S63 by using the temporary encryption key and outputs the result as internal transmission data to the playback block 170. The temporary encryption key used here is a random temporary encryption key generated by the re-encryption block 126 at prescribed time intervals. The re-encryption block 126 changes the temporary encryption key every two seconds, for instance.

Step S65: The re-encryption block 126 checks whether the temporary encryption key used in the encryption processing in step S64 is different from the key used in the preceding session. If the key has been changed, the processing proceeds to step S66. If the key has not been changed, the processing proceeds to step S69.

Step S66: The re-encryption block 126 selects one of a plurality of pieces of position determination program information stored in the position determination information storage block 115. The re-encryption block 126 then calculates a storage position of the temporary decryption key in accordance with the procedure of processing described in the selected piece of position determination program information. A position key necessary for deciphering the storage position is also generated. Then, the re-encryption block 126 stores the temporary encryption key in the calculated position in the temporary decryption key storage block 131.

Step S67: The re-encryption block 126 obtains the position decipherment program information corresponding to the position determination program information selected in step S66, from the position determination information storage block 115. The re-encryption block 126 sends the position key generated in step S66 to the playback block 170 and places the position decipherment program information in a particular position in the memory area where the program for implementing the playback block 170 is expanded.

Step S68: The playback block 170 calculates the position where the temporary decryption key should be placed, from the position decipherment program information placed in step S67 and the sent position key. The playback block 170 obtains the temporary decryption key from the calculated position in the temporary decryption key storage block 131.

Step S69: The playback block 170 decrypts the internal transmission data obtained from the re-encryption block 126 to obtain split pieces of content by using the temporary decryption key.

Step S70: The playback block 170 combines the plurality of split pieces of content obtained in the decryption in step S69 and reproduces the content. The playback block 170 plays the reproduced content and displays the content on the monitor 61.

The decryption block 125 decrypts the distribution data distributed from the content distribution server 200 by using the decryption key. The re-encryption block 126 divides the content obtained by the decryption, to split pieces of content, encrypts the content to obtain internal transmission data by using the temporary encryption key. If the temporary encryption key is changed, the re-encryption block 126 stores a new temporary decryption key in the temporary decryption key storage block 131. The playback block 170 decrypts the internal transmission data to obtain split pieces of content by using the temporary decryption key stored in the temporary decryption key storage block 131. The playback block 170 combines the split pieces of content and plays the content.

Figure 14:
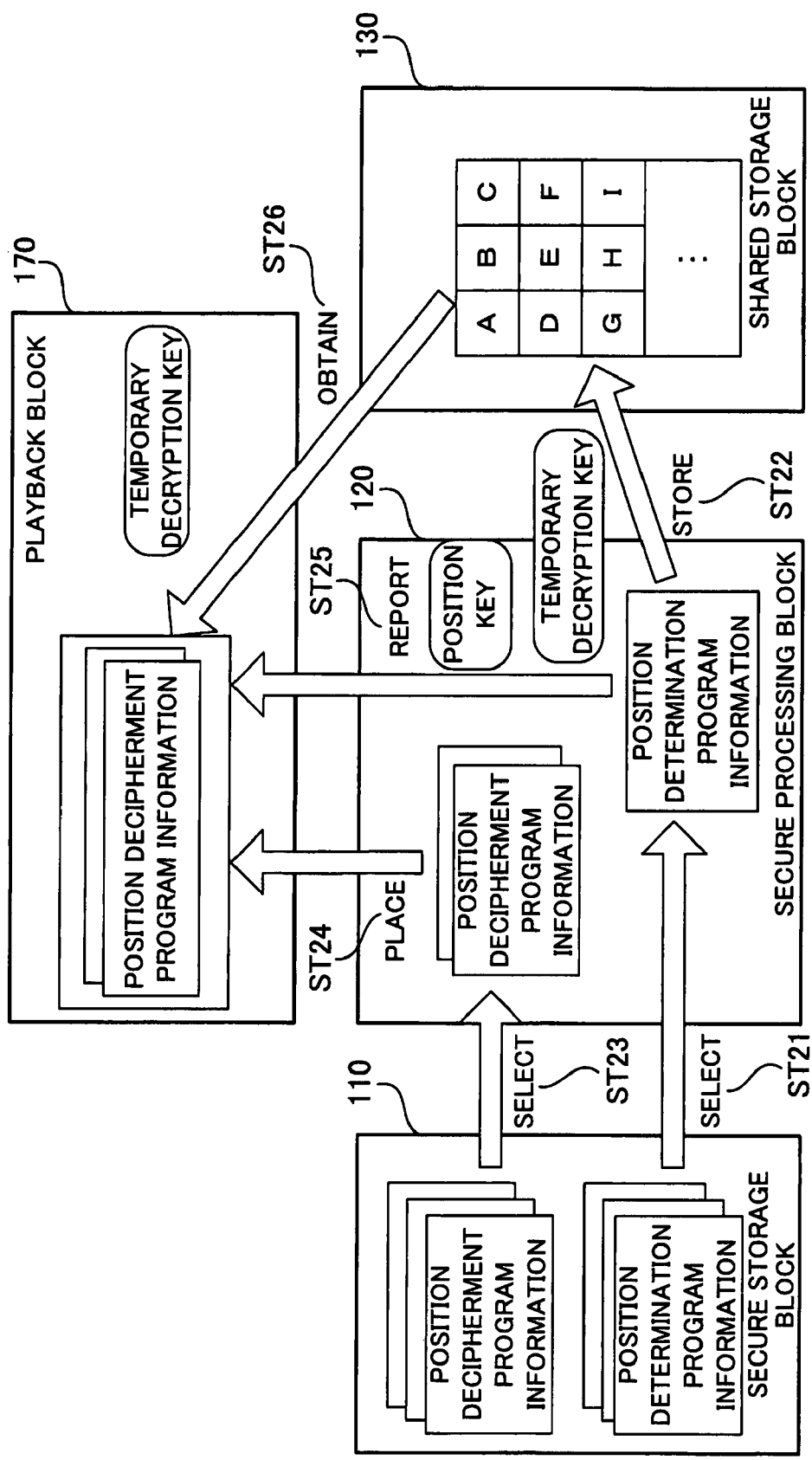
FIG. 14 is a diagram showing the flow of acquisition of a temporary decryption key.

FIG. 14 is a diagram showing the flow of acquisition of the temporary decryption key.

First, one piece of the position determination program information stored in the secure storage block 110 is selected and read into the secure processing block 120 (in step ST21). In the secure processing block 120, a particular position in the shared storage block 130 is calculated in accordance with the read position determination program information, and a position key needed for deciphering the position is generated.

The temporary decryption key is stored in the calculated position (in step ST22). When the temporary decryption key is stored, dummy data is written in other areas so that the storage position will not be analyzed.

The position decipherment program information corresponding to the position determination program selected in step ST21 is selected from the information stored in the secure storage block 110 and read into the secure processing block 120. One or more different pieces of position decipherment program information are also selected at random and read (in step ST23).

The position decipherment program information selected in step ST23 is placed in the playback block 170 (in step ST24). The position decipherment program information unnecessary for deciphering the storage position is also placed in order to prevent the position decipherment program information actually used from being identified when the RAM 102 is analyzed. The position key generated in accordance with the position determination program information is also sent to the playback block 170 (in step ST25).

The playback block 170 identifies one piece of position decipherment program information to be used, from the plurality of pieces of that information, in accordance with the sent position key. Then, the storage position of the temporary decryption key is calculated from the identified position decipherment program information and the position key. The temporary decryption key in the calculated position in the shared storage block 130 is read into the playback block 170 (in step ST26).

The content-viewing PC 100 can reliably prevent the decryption key and the decryption algorithm from being revealed even if a memory image expanded in the RAM 102 is analyzed during playback of the content. In addition, it becomes hard to analyze the temporary decryption key for use in decryption of the internal transmission data. Even if the temporary decryption key is revealed, the range of influence can be minimized because the key is changed at prescribed time intervals.

Because the secure LSI module 107 should provide a minimum storage area, the circuit size can be reduced. The fabrication cost of a tamper-resistant LSI chip is likely to become high, but the reduction in circuit size helps reduce the fabrication cost.

Another Embodiment

Another embodiment will be described in detail with reference to figures. Differences from one embodiment described above will be mainly explained, and a description of similarities will be omitted.

A content distribution system of another embodiment can be implemented by the same structure as the system structure of one embodiment shown in FIG. 2, except that a content-viewing PC 100*c* is connected to a network 50. The content-viewing PC 100*c* can be implemented by the same structure as the hardware structure of the content-viewing PC 100 shown in FIG. 3.

The module structure of the content-viewing PC 100*c* will next be described.

Figure 15:
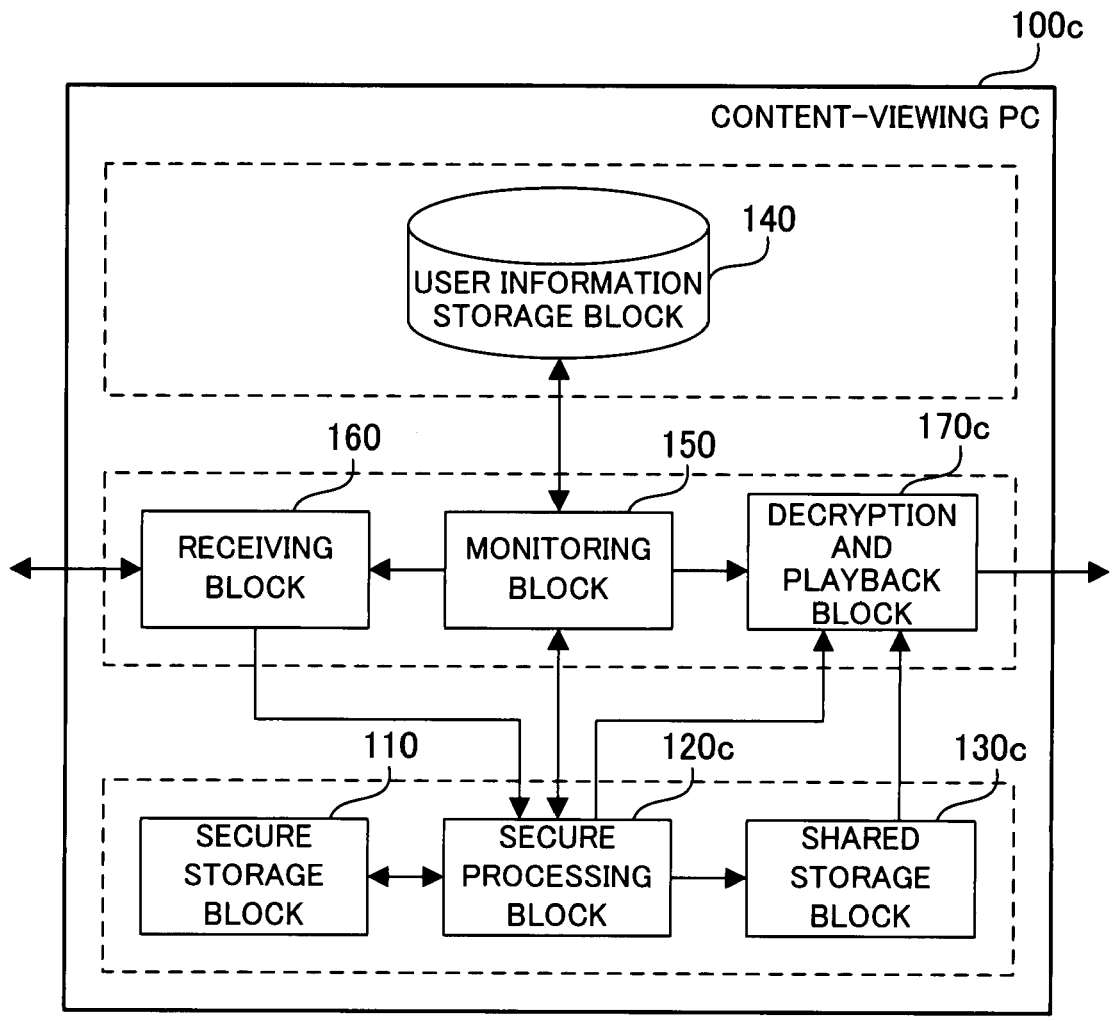
FIG. 15 is a block diagram showing functions of a content-viewing PC according to another embodiment.

FIG. 15 is a block diagram showing functions of the content-viewing PC 100*c* of another embodiment. The content-viewing PC 100*c* includes a secure storage block 110, a secure processing block 120*c*, a shared storage block 130*c*, a user information storage block 140, a monitoring block 150, a receiving block 160, and a decryption and playback block 170*c*. The receiving block 160 can communicate with a content distribution server 200 through the network 50. The decryption and playback block 170*c* can display content being played, on the screen of a monitor 61.

The secure storage block 110, the user information storage block 140, the monitoring block 150, and the receiving block 160 have the same processing functions as those in one embodiment shown in FIG. 4.

When the secure processing block 120*c* obtains distribution data from the receiving block 160, the secure processing block 120*c* does not perform decryption and divides the distribution data into split distribution data items having a prescribed data length. The secure processing block 120*c* encrypts the split distribution data items by using a temporary encryption key, which is changed periodically, and outputs the result as internal transmission data to the decryption and playback block 170*c*. The secure processing block 120*c* stores a temporary decryption key corresponding to the temporary encryption key and key data created by encrypting the decryption key by using the temporary encryption key, in the shared storage block 130*c*. The other processing functions of the secure processing block 120*c* are the same as those of the secure processing block 120 of one embodiment.

The shared storage block 130*c* stores the temporary decryption key corresponding to the temporary encryption key and the key data obtained by encrypting the decryption key by using the temporary encryption key. The information stored in the shared storage block 130*c* can be referenced and updated from both the secure processing block 120*c* and the decryption and playback block 170*c*.

The decryption and playback block 170*c* obtains the internal transmission data output from the secure processing block 120*c* and then obtains the temporary decryption key and the key data from the shared storage block 130*c*. Next, the decryption and playback block 170*c* decrypts the internal transmission data to obtain the split distribution data items by using the temporary decryption key and decrypts the key data to obtain the decryption key. The decryption and playback block 170*c* then reproduces the distribution data by combining the plurality of split distribution data items and decrypts the data to obtain content by using the decryption key obtained by the decryption. After that, the decryption and playback block 170*c* plays the content obtained by the decryption and displays the content on the monitor 61.

The secure processing block 120*c* can store the temporary encryption key and the key data in the shared storage block 130*c*, and the decryption and playback block 170*c* can obtain them from the shared storage block 130*c*, in the same ways as in one embodiment.

Figure 16:
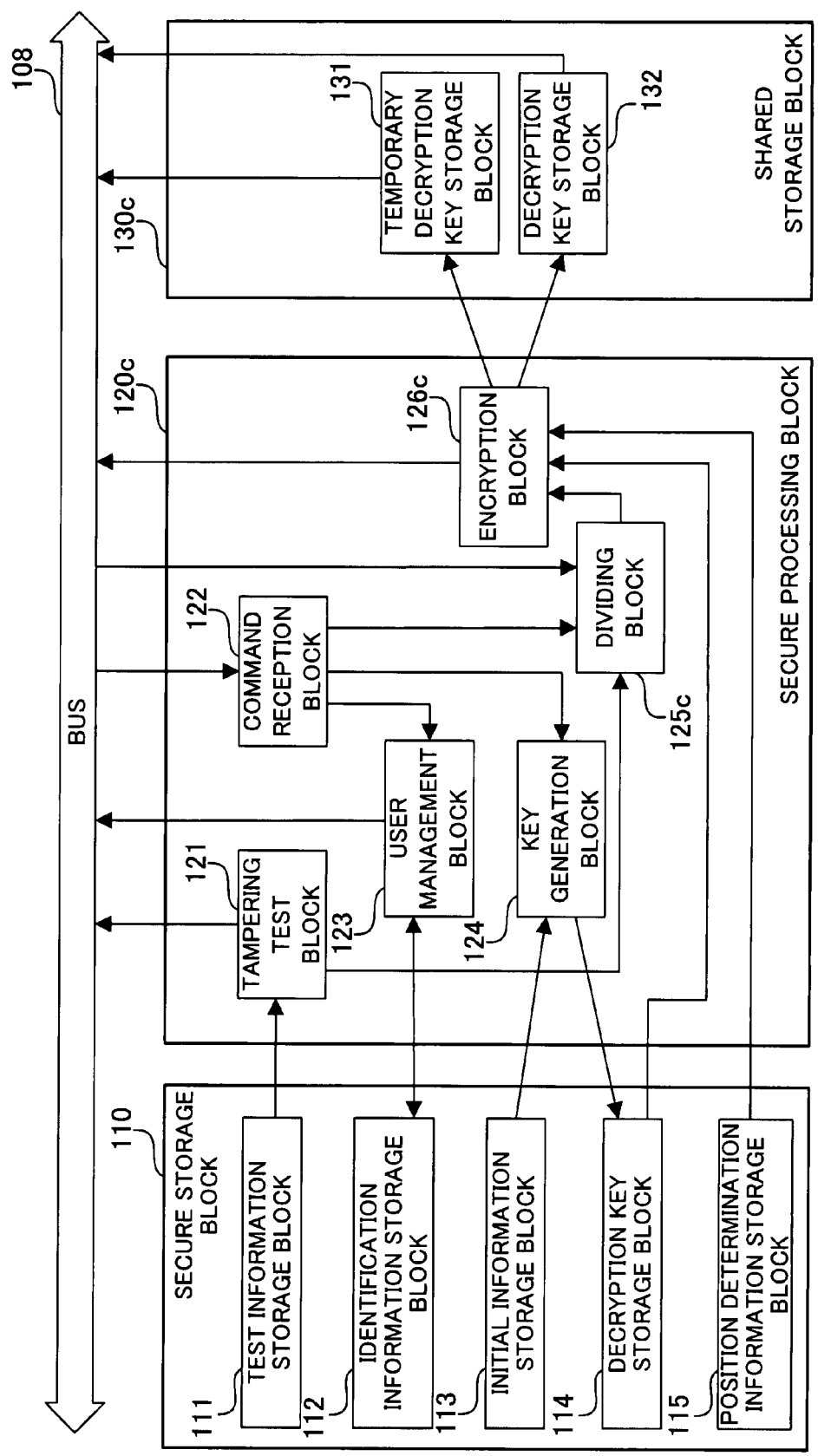
FIG. 16 is a block diagram showing functions of a secure LSI module according to another embodiment.

FIG. 16 is a block diagram showing functions of a secure LSI module according to another embodiment. The secure storage block 110 has the same module structure as that of one embodiment.

The secure processing block 120*c* includes a tampering test block 121, a command reception block 122, a user management block 123, a key generation block 124, a dividing block 125*c*, and an encryption block 126*c*. The tampering test block 121, the command reception block 122, the user management block 123, and the key generation block 124 have the same processing functions as those of one embodiment.

The dividing block 125*c* obtains distribution data from the receiving block 160 and divides the distribution data into split distribution data items having a prescribed data length. The split distribution data items are output to the encryption block 126*c*.

The encryption block 126*c* obtains the split distribution data items from the dividing block 125*c*, encrypts the individual items by using the temporary encryption key, and outputs the result as internal transmission data to the decryption and playback block 170*c*. Each time the temporary encryption key is changed, the encryption block 126*c* stores the corresponding temporary decryption key in a temporary decryption key storage block 131. The encryption block 126*c* stores the key data obtained by encrypting the decryption key stored in the decryption key storage block 114 by using the temporary encryption key, in a decryption key storage block 132.

The encryption block 126*c* determines the storage positions of the temporary decryption key and the key data by selecting one piece of the position determination program information stored in the position determination information storage block 115 and executing the processing described in the selected piece of the position determination program information. The encryption block 126*c* obtains the position decipherment program information corresponding to the selected piece of position determination program information from the position determination information storage block 115 and sends the information to the decryption and playback block 170*c*.

The shared storage block 130*c* includes the temporary decryption key storage block 131 and the decryption key storage block 132. The temporary decryption key storage block 131 stores the temporary decryption key output from the encryption block 126*c*. The decryption key storage block 132 stores the key data output from the encryption block 126*c*. The stored temporary decryption key and key data are read by the decryption and playback block 170*c*.

Figure 17:
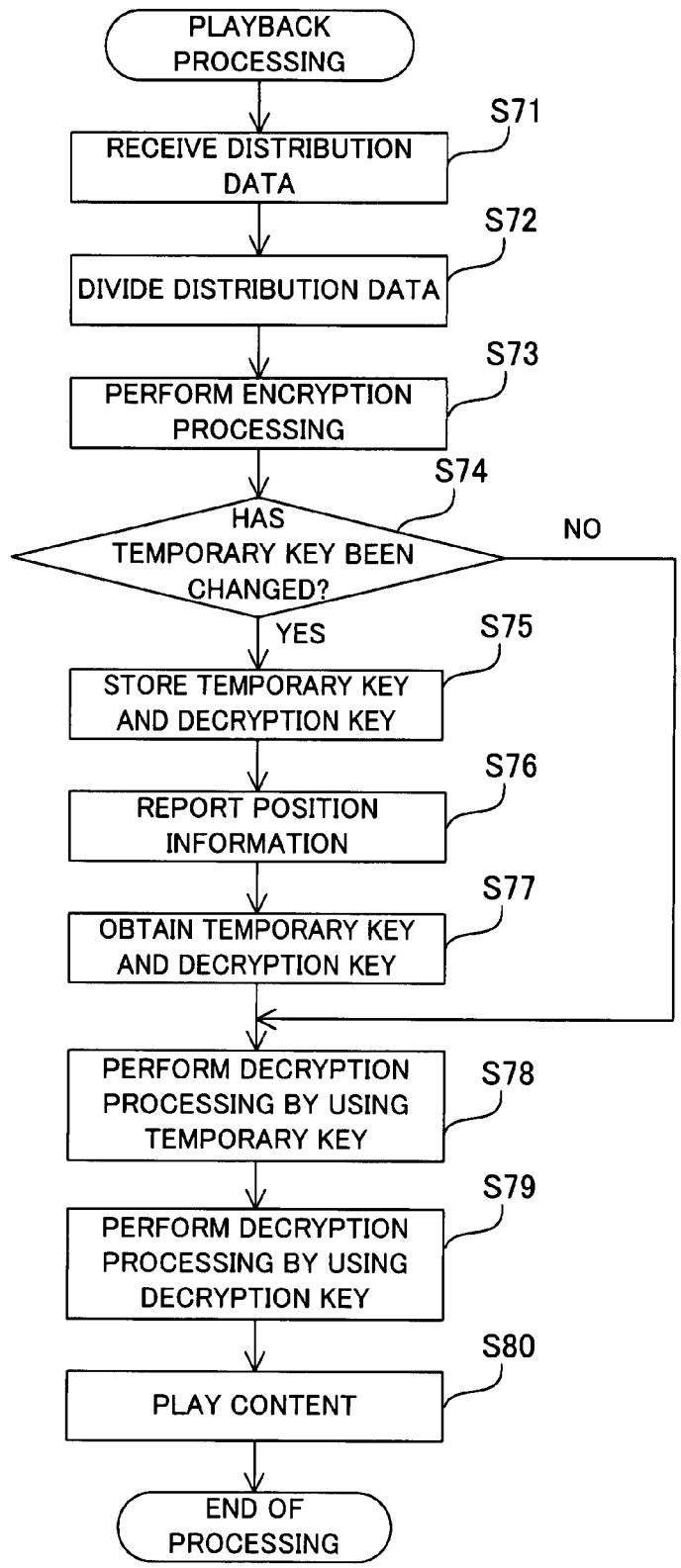
FIG. 17 is a flow chart showing a procedure of playback processing according to another embodiment.

FIG. 17 is a flow chart showing a procedure of playback processing of another embodiment. The processing shown in FIG. 17 will be described in order of step number.

Step S71: The receiving block 160 receives distribution data from the content distribution server 200 through the network 50. The receiving block 160 transfers the received distribution data to the dividing block 125*c*.

Step S72: The dividing block 125*c* divides the obtained distribution data into split distribution data items having a prescribed data length. The dividing block 125*c* outputs the split distribution data items to the encryption block 126*c*.

Step S73: The encryption block 126*c* obtains the split distribution data items, encrypts the individual items by using the temporary encryption key, and outputs the data items as internal transmission data to the decryption and playback block 170*c*.

Step S74: The encryption block 126*c* checks whether the temporary encryption key used in the encryption processing in step S73 has been changed from the one used in the preceding session. When the key has been changed, the processing proceeds to step S75. If the key has not been changed, the processing proceeds to step S78.

Step S75: The encryption block 126*c* selects one of a plurality of pieces of position determination program information stored in the position determination information storage block 115. The encryption block 126*c* then calculates the storage positions of the temporary decryption key and the encrypted decryption key, which is decryption data, according to the procedure of the processing described in the selected piece of position determination program information. In addition, a position key needed for deciphering the storage positions is generated. Then, the encryption block 126*c* stores the temporary encryption key in the calculated position in the temporary decryption key storage block 131. The encryption block 126*c* also generates key data by encrypting the decryption key stored in the decryption key storage block 114 by using the temporary encryption key and stores the key data in the calculated position in the decryption key storage block 132.

Step S76: The encryption block 126*c* obtains the position decipherment program information corresponding to the position determination program information selected in step S75, from the position determination information storage block 115. The encryption block 126*c* places the position key generated in step S75 and the position decipherment program information in a particular position in the memory area where a program for implementing the decryption and playback block 170*c* is expanded.

Step S77: The decryption and playback block 170*c* calculates the positions where the temporary decryption key and the key data are placed, from the position decipherment program information and the position key placed in step S76. The decryption and playback block 170*c* obtains the temporary decryption key from the calculated position in the temporary decryption key storage block 131 and the key data from the calculated position in the decryption key storage block 132.

Step S78: The decryption and playback block 170*c* decrypts the internal transmission data obtained from the encryption block 126*c* to obtain the split distribution data items by using the temporary decryption key. The decryption and playback block 170*c* decrypts the key data to obtain the decryption key by using the temporary decryption key.

Step S79: The decryption and playback block 170*c* combines the plurality of split distribution data items obtained by the decryption in step S78 and reproduces the distribution data. The decryption and playback block 170*c* then decrypts the reproduced distribution data to obtain the content by using the decryption key obtained by the decryption in step S78.

Step S80: The decryption and playback block 170*c* plays the content obtained by the decryption in step S79 and displays the content on the monitor 61.

The dividing block 125*c* divides the distribution data distributed from the content distribution server 200 into split distribution data items, as has been described above. The encryption block 126*c* encrypts the individual split distribution data items by using the temporary encryption key and outputs the result as internal transmission data. When the temporary encryption key is changed, the encryption block 126*c* stores a new temporary decryption key in the temporary decryption key storage block 131 and stores key data obtained by encrypting the decryption key by using the temporary encryption key in the decryption key storage block 132. The decryption and playback block 170c decrypts the internal transmission data to obtain the split distribution data items by using the temporary decryption key stored in the temporary decryption key storage block 131 and decrypts the key data to obtain the decryption key. The decryption and playback block 170c then reproduces the distribution data by combining the split distribution data items, decrypts the data to obtain the content by using the decryption key, and plays the content.

The content-viewing PC 100c can prevent the decryption key and the decryption algorithm from being revealed even when the memory image expanded in the RAM 102 is analyzed during playback of the content. It becomes also hard to analyze the temporary decryption key for use in decryption of the internal transmission data. Even if the temporary decryption key is revealed, the range of influence can be minimized because the key is changed at prescribed intervals.

The decryption processing is performed by easily expandable hardware such as the CPU 101. Accordingly, smooth decryption processing can be performed even if the secure module does not have sufficient processing capabilities for the decryption processing. In addition, a variety of encryption algorithms can also be supported.

Because the secure LSI module should provide a minimum storage area, the circuit size can be reduced. The fabrication cost of a tamper-resistant LSI chip is likely to become high, but the reduction in circuit size helps reduce the fabrication cost.

Information processing apparatuses according to the present embodiment have been described on the basis of the embodiments shown in the figures, but the present embodiment is not limited to them. Each component structure can be replaced with any structure having the same function. Another item or process may be added to the present embodiment. The present embodiment may be a combination of any two or more structures (features) of the embodiments described above.

If a part of the processing functions provided by the content-viewing PCs 100 and 100c is implemented by software, a program describing the processing performed by the function is provided. When the program is executed on a computer, the processing function is implemented on the computer.

The program describing the processing can be recorded on a computer-readable recording medium. Such computer-readable recording media include magnetic recording devices, optical discs, magneto-optical recording media, and semiconductor memories, for instance. The magnetic recording devices include hard disk drives (HDDs), flexible disks (FDs), and magnetic tapes, for instance. The optical discs include digital versatile discs (DVDs), DVD-RAMs, compact disc read only memories (CD-ROMs), CD-Rs (recodables), and CD-RWs (rewritables). The magneto-optical recording media include magneto-optical disks (MOs), for instance.

The program is distributed, for instance, by selling portable recording media such as DVDs and CD-ROMs on which the program has been recorded. The program can also be stored in a storage device of a server computer and can be transferred from the server computer to another computer through a network.

The computer for executing the program stores the program recorded in the portable recording medium or the program transferred from the server computer in its own storage device. The computer then reads the program from its own storage device and executes the processing in accordance with the program. The computer can also read the program directly from the portable medium and can execute the processing in accordance with the program. Moreover, the computer can execute processing in accordance with the program received from the server computer each time the program is transferred.

According to the present embodiment, the decryption key for the distribution data is stored in the secure module having tamper resistance. This prevents the decryption key for the distribution data from being obtained even if the contents of the memory of the information processing apparatus are analyzed. In the secure module having tamper resistance, content is divided into a plurality of parts and re-encrypted by using the temporary encryption key. This prevents the re-encryption algorithm from being revealed even if the contents of the memory of the information processing apparatus are analyzed. Even if the temporary decryption key is revealed, the range of influence can be minimized.

Because the secure module does not need to store the content, the secure module should have a minimum storage area, and the circuit size of the secure module can be reduced.

The content decryption processing performed in the secure module can protect the mechanism of playback processing more securely from an attempt of analysis. The content decryption processing performed by software allows content to be successfully played by making the most of the computing capabilities of the information processing apparatus even if the content exceeding the decryption capability of the secure module is received. Decryption processing compatible with a greater variety of encryption algorithms can be performed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information processing apparatus capable of playing content distributed through a network, the information processing apparatus comprising:

a secure module having tamper resistance including:
   a key storage block to store a decryption key for use in decryption of encrypted content, which is distribution data;
   a decryption block to receive the distribution data and to derypt the distribution data to obtain the content by using the decryption key stored in the key storage block; and
   an encryption block to divide the content obtained by the decryption in the decryption block into a plurality of split pieces of content, to encrypt each of the split pieces of content by using a temporary encryption key to be changed at prescribed time intervals, to output the result as internal transmission data, and to output information on a temporary decryption key for use in decryption of the internal transmission data each time the temporary encryption key is changed;
receiving unit to receive the distribution data distributed through the network and to transfer the distribution data to the decryption block in the secure module;
playback unit to obtain the internal transmission data and the information on the temporary decryption key output from the encryption block in the secure module, decrypt the internal transmission data to obtain the split pieces of content by using the temporary decryption key, and to play the content by combining the plurality of split pieces of content obtained by the decryption; and a shared storage unit to be accessible from both the encryption block in the secure module and the playback unit, wherein the encryption block selects a storage position from a plurality of candidate positions included in the shared storage unit, stores the temporary decryption key in the selected storage position and outputs position information indicating the storage position of the temporary decryption key each time the temporary encryption key is changed; and the playback unit obtains the temporary decryption key from the shared storage unit in accordance with the position information output by the encryption block.

2. The information processing apparatus according to claim 1, wherein the secure module further comprises:
   an initial information storage block to store beforehand initial information required to generate the decryption key; and
   a key generation block to generate the decryption key, when key change information giving an instruction to change the decryption key is input, from the initial information stored in the initial information storage block and the key change information, and to store the decryption key in the key storage block, and the receiving unit receives the key change information and transfers the key change information to the key generation block in the secure module.

* * * * *

UNITED STATES PATENT AND TRADEMARK OFFICE
CERTIFICATE OF CORRECTION

| | | |
|---|---|---|
| PATENT NO. | : 8,306,230 B2 | Page 1 of 1 |
| APPLICATION NO. | : 11/976764 | |
| DATED | : November 6, 2012 | |
| INVENTOR(S) | : Masakazu Takakusu et al. | |

It is certified that error appears in the above-identified patent and that said Letters Patent is hereby corrected as shown below:

Column 22, Line 48, In Claim 1, delete "derypt" and insert -- decrypt --, therefor.

Signed and Sealed this
Twenty-ninth Day of January, 2013

David J. Kappos
*Director of the United States Patent and Trademark Office*